US009630384B2

(12) United States Patent
Haak et al.

(10) Patent No.: US 9,630,384 B2
(45) Date of Patent: Apr. 25, 2017

(54) DURABLE EXTRUDED DYED POLYESTER FILMS

(71) Applicant: 3M INNOVATIVE PROPERTIES COMPANY, Saint Paul, MN (US)

(72) Inventors: Christopher A. Haak, Pine Springs, MN (US); Joseph M. Zoborowski, Vadnais Heights, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 14/640,056

(22) Filed: Mar. 6, 2015

(65) Prior Publication Data
US 2015/0251395 A1 Sep. 10, 2015

Related U.S. Application Data

(60) Provisional application No. 61/949,283, filed on Mar. 7, 2014.

(51) Int. Cl.
| | |
|---|---|
| *B32B 27/36* | (2006.01) |
| *B32B 27/08* | (2006.01) |
| *B32B 27/20* | (2006.01) |
| *B32B 7/12* | (2006.01) |
| *B29C 47/00* | (2006.01) |
| *C08L 67/03* | (2006.01) |
| *B29C 47/06* | (2006.01) |

(52) U.S. Cl.
CPC .......... *B32B 27/36* (2013.01); *B29C 47/0021* (2013.01); *B29C 47/065* (2013.01); *B32B 7/12* (2013.01); *B32B 27/08* (2013.01); *B32B 27/20* (2013.01); *C08L 67/03* (2013.01); *B32B 2307/4026* (2013.01); *B32B 2307/412* (2013.01); *B32B 2307/71* (2013.01); *B32B 2307/712* (2013.01); *B32B 2307/744* (2013.01); *B32B 2457/20* (2013.01); *B32B 2605/006* (2013.01); *C08J 2367/03* (2013.01); *C08J 2467/03* (2013.01); *C08L 2201/08* (2013.01); *C08L 2201/10* (2013.01); *C08L 2203/16* (2013.01); *C08L 2205/025* (2013.01); *C08L 2205/03* (2013.01); *Y10T 428/24372* (2015.01); *Y10T 428/2848* (2015.01); *Y10T 428/31786* (2015.04)

(58) Field of Classification Search
CPC ......... B32B 27/36; B32B 27/08; B32B 37/14; B32B 27/20; B32B 2307/712; B32B 2307/412; B32B 2307/71; B32B 2250/03; B32B 2605/006; B32B 2307/4026; B32B 2307/744; C08L 67/03; C08L 2205/03; C08L 2205/025; C08L 2203/16; C08L 2201/10; C08L 2201/08; C08J 5/18; C08J 2367/03; C08J 2467/03; Y10T 428/24355; Y10T 428/24364; Y10T 428/24372; Y10T 428/24405; Y10T 428/24413; Y10T 428/24421; Y10T 428/2848
USPC .................. 428/141–149, 354, 480
See application file for complete search history.

(56) References Cited

U.S. PATENT DOCUMENTS

| | | | |
|---|---|---|---|
| 2,882,119 | A | 4/1959 | Laucius |
| 3,034,847 | A | 5/1962 | Chapman |
| 3,467,481 | A | 9/1969 | Gold |
| 3,512,913 | A | 5/1970 | Day |
| 3,558,260 | A | 1/1971 | Hermes |
| 3,644,270 | A | 2/1972 | Valiaveedan |
| 3,743,476 | A | 7/1973 | Gehrke |
| 3,753,645 | A | 8/1973 | Neeff |
| 3,804,589 | A | 4/1974 | Dawson et al. |
| 3,853,807 | A | 12/1974 | Hunter |
| 3,879,341 | A | 4/1975 | Barkey |
| 3,943,105 | A | 3/1976 | Hermes |
| 3,958,934 | A | 5/1976 | Jackson |
| 4,047,889 | A | 9/1977 | Hermes |
| 4,065,259 | A | 12/1977 | Jackson |
| 4,115,054 | A | 9/1978 | Hermes |
| 4,191,679 | A | 3/1980 | Okita |
| 4,399,265 | A | 8/1983 | Garware |
| 5,162,046 | A | 11/1992 | Mercado |
| 5,338,318 | A | 8/1994 | Mercado |
| 5,674,948 | A * | 10/1997 | Vonk .................... C08K 5/0041 524/80 |
| 5,683,805 | A | 11/1997 | Oita |
| 5,699,188 | A | 12/1997 | Gilbert |
| 5,837,012 | A | 11/1998 | Kawamoto |
| 6,221,112 | B1 | 4/2001 | Snider |
| 6,228,910 | B1 | 5/2001 | Shakhnovich |
| 6,294,251 | B1 | 9/2001 | Minagawa |
| 6,316,531 | B1 | 11/2001 | Garware |

(Continued)

FOREIGN PATENT DOCUMENTS

| | | |
|---|---|---|
| EP | 0338434 | 10/1889 |
| IN | 1029/DEL/2001 | 5/2005 |

(Continued)

OTHER PUBLICATIONS

JP 2003/145701 issued to Shigehiro dated May 21, 2003 with English Machine Translation.
Shiffhardin LLP. Petition CP 12-32009 pp. 1, 2 and 9; ANSI Z97.1-2009ᵉ Table of Contents and pp. 3, 4, 9, 10 and 27-32.
Takeuchi et al. 2012. *SEI Technical Review*. No. 64, pp. 95-105. "Development of Window Films for Solar Shading and Heat Insulating Applications".
PCT International Search Report for PCT/US15/19085 mailed Jun. 19, 2015.
PCT Written Opinion of the International Searching Authority for PCT/US15/19085 mailed Jun. 19, 2015.

(Continued)

*Primary Examiner* — Nathan Van Sell
(74) *Attorney, Agent, or Firm* — 3M Innovative Properties Company; Carlos M. Téllez

(57) ABSTRACT

The present disclosure relates to dyed polyester films whose color remains stable after prolonged exposure to UV radiation and to methods of making such dyed polyester films.

10 Claims, 19 Drawing Sheets

(56) References Cited

U.S. PATENT DOCUMENTS

| | | |
|---|---|---|
| 6,440,551 B1 | 8/2002 | Enniss |
| 6,569,517 B1 | 5/2003 | McGurran |
| 6,811,867 B1 | 11/2004 | McGurran |
| 6,953,618 B2 | 10/2005 | Enniss |
| 6,962,609 B2 | 11/2005 | Rogers |
| 7,368,161 B2 | 5/2008 | McGurran |
| 8,182,924 B2 | 5/2012 | Hebrink |
| 8,409,720 B2 | 4/2013 | Hebrink |
| 8,568,869 B2 | 10/2013 | Hebrink |
| 2002/0064650 A1* | 5/2002 | Masuda ............ 428/336 |
| 2002/0068185 A1 | 6/2002 | Greener |
| 2004/0009342 A1 | 1/2004 | Janssens |
| 2004/0026816 A1 | 2/2004 | Greener |
| 2004/0185281 A1 | 9/2004 | Suh |
| 2006/0228592 A1 | 10/2006 | Stover |
| 2007/0223097 A1 | 9/2007 | Garware |
| 2007/0248810 A1 | 10/2007 | McGee |
| 2008/0318073 A1* | 12/2008 | Klein ............ B29C 55/023 428/480 |
| 2010/0040904 A1 | 2/2010 | Cloutier |
| 2010/0327480 A1 | 12/2010 | Dontula |
| 2011/0112234 A1* | 5/2011 | Hall-Goulle ......... A61K 8/02 524/495 |
| 2012/0227795 A1 | 9/2012 | Kameda |
| 2013/0059140 A1 | 3/2013 | Hlavinka |

FOREIGN PATENT DOCUMENTS

| | | |
|---|---|---|
| IN | 217109 | 12/2005 |
| IN | 318/MUM/2006 | 8/2008 |
| JP | 2003/145701 | 5/2003 |
| WO | WO 99/36248 | 7/1999 |
| WO | WO 99/36262 | 7/1999 |
| WO | WO 01/58989 | 8/2001 |
| WO | WO 02/41045 | 5/2002 |
| WO | WO 2012/039856 | 3/2012 |

OTHER PUBLICATIONS

* cited by examiner

DURABLE EXTRUDED DYED POLYESTER FILMS

The present disclosure relates to dyed polyester films whose color remains stable after prolonged exposure to UV radiation, to methods of making such dyed polyester films, and to articles containing such films.

BACKGROUND

Tinted polymeric films, and particularly tinted polymeric films made of a polyester, find utility in a broad range of applications. Those films, for example, can be applied to a base transparent substrate (e.g., a window or auto glass pane) to provide a neutral color tint to the window or auto glass. They can also be used to tint the surface of a display device, mirror, or other piece of optical equipment.

One method for tinting a polymeric base film employs dyeing the base film with one or more color dyes. Typically, in such methods, the neutral color, or "tint," is obtained by blending the base film material with a combination of yellow, red, and blue dyes. In general, the relative proportion of each of those dyes determines the final tint of the film. One method used for many years to make colored polymeric films, such as those made with polyethylene terephthalate (PET), is the dip dyeing process. In that process, a clear polyester film (e.g., PET) is immersed in a liquid bath of a hot dye carrier, usually consisting of a polyhydric alcohol with relatively low molecular weight such as ethylene glycol (EG), typically at about 130° C.-150° C. The hot liquid polyhydric alcohol bath contains one or more dissolved dyes. The dyes diffuse into the clear PET film, imparting color to the film. The dyed film is then washed with a suitable solvent, such as n-methyl pyrrolidone (NMP) and then dried in an oven before being rewound into rolls.

The inventors have observed that while dyed films generally retain high clarity and low haze, prolonged exposure to ultraviolet radiation, which occurs naturally during use or by exposure to fluorescent light or other UV-emitting light source, can cause significant degradation of the dye molecules and lead to tinting color alteration, tinting power deterioration, bleachings, and increased light transmission (fading).

Despite those known limitations, the dip-dyeing process has become the defacto standard process used in the industry to produce dyed films and is currently used by most of the major window film producers in the world. Notwithstanding the popularity of the dip-dyeing process among major tinted window film manufacturers, there remains a need to have dyed polyester films whose color remains stable after prolonged exposure to UV radiation.

SUMMARY

The present disclosure is directed generally to films and methods of making such films. In one embodiment, the present disclosure is directed to dyed polyester films whose color remains stable after prolonged exposure to UV radiation. In another embodiment, the present disclosure is directed to methods of making dyed polyester films comprising dissolving a durable dye in the molten polyester.

In one embodiment, the durable dyed polyester films comprise at least three layers, a core layer comprising a dyed polyester and two non-dyed outer layers comprising, independently from each other, the same or a different polyester as in the core layer. That is, the core layer is encapsulated between two outer layers that provide improved film performance and improved processability. In one embodiment, the polyester in the core and in both outer layers is the same. In another embodiment, the polyester used in one or more of the layers of the film is polyethylene terephthalate. In another embodiment, the two outer encapsulating layers are optional.

In certain embodiments, the two outer layers are immediately adjacent to the core polyester layer. In other, less common embodiments, the two outer layers are adjacent the core polyester layer, but additional intermediate layers are optional between one or both of the outer layers and the core polyester layer.

In one embodiment, the durable dyed polyester films comprise one or more thermally-durable dyes that are capable of dissolving in the polyester of the core layer, such as anthraquinone dyes (e.g., Pigment Yellow 147, Solvent Yellow 163, Pigment Blue 60, Pigment Red 177), perylene dyes (e.g., Pigment Black 31, Pigment Black 32, Pigment Red 149, and quinacridone dyes (e.g., Pigment Red 122). In one embodiment, the durable dyed polyester films of the present disclosure are optically clear and are fade-resistant after exposure to ultraviolet (UV) radiation.

In one embodiment, the two outer polyester layers are intended to have the same composition and thickness. In another embodiment, the two outer polyester layers are intended to have different composition from each other.

In another embodiment, the methods of making dyed polyester films comprise dissolving one or more durable dyes in the molten polyester and then coextruding the two outer polyester layers with the core layer. In another embodiment, each of the two outer polyester layers and the core polyester layer is extruded separately and then all three layers are laminated together, optionally with the use of an adhesive in between any two polyester layers.

All scientific and technical terms used herein have meanings commonly used in the art unless otherwise specified. The definitions provided herein are to facilitate understanding of certain terms used frequently herein and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

The term "adjacent" refers to the relative position of two elements that are close to each other and may or may not be necessarily in contact with each other or have one or more layers separating the two elements as understood by the context in which "adjacent" appears.

The term "immediately adjacent" refers to the relative position of two elements that are next to each other and in contact with each other and have no intermediate layers separating the two elements.

The term "optically clear" as used herein refers to an article (e.g., a film) that has a luminous transmittance of between 3 and 80 percent and that exhibits a haze value lower than 10% in the 400 nm to 700 nm wavelength range. Both the luminous transmission and the total haze can be determined using, for example, a BYK Gardner Haze-gard Plus (Catalog No. 4725) according to the method of ASTM-D 1003-13, Procedure A (Hazemeter). Where total haze is the percent of total transmitted light which, in passing through the film specimen deviated from the incident beam through forward scatter by more than 0.044 radians (2.5 degrees) on average.

The term "adhesive" as used herein refers to polymeric compositions useful to adhere together two components (adherents). Examples of adhesives include heat activated adhesives and pressure sensitive adhesives.

The term "dye" as used herein refers to a colored material that dissolves in a given molten polymer (e.g., a polyester, such as PET), such that the haze of the solidified polymer with the dissolved dye after made into a film is not greater than 10 percent. In certain embodiments, the colored materials used in certain films disclosed in this application refer to dyes that are soluble in molten PET but that are not soluble in polyhydric alcohols (have a solubility of less than 1%) at the conditions used in a dipped-dye process, and, therefore, would not be able to be used in a dipped-dye process. In other embodiments, the colored materials used in certain films disclosed in this application refer to dyes that are soluble in molten PET and that are also soluble in polyhydric alcohols and could also be used in a dipped-dye process. Typically, the solubility of a dye in a polyhydric alcohol used in the dipped-dye process is 1% or greater. Examples of polyhydric alcohols include ethylene glycol, glycerin, diethyl glycol, propylene glycol, dipropylene glycol, pentaerythritol and others. The term "pigment" as used herein refers to a colored material that does not dissolve completely in a given solvent. The solvent system can be molten polymer which maintains dye solubility upon solidification. Under certain circumstances, a given colored material can be a dye, if it is soluble in a given solvent, but can also be a pigment with respect to a different solvent in which it does not completely dissolve. In this disclosure, a dye is not intended to be a material that forms dispersions or emulsions in a given solvent. If a colored material is not a dye for a given solvent system and given conditions, then it is considered a pigment for that solvent system and those conditions.

Color fastness of a film can be determined as a function of color change ($\Delta E_{ab}^*$), as measured by CIE L*a*b* color system using illuminant D65 in a colorimeter device such as a HunterLab UltraScan PRO (SN USP1828) upon UV exposure. Where $\Delta E_{ab}^*$ is defined as:

$$\Delta E_{ab}^* = [(\Delta L^*)^2 + (\Delta a^*)^2 + (\Delta b^*)^2]^{1/2}$$

And $\Delta E_{ab}^*$ defines the total color difference between an aged film sample and the initial, unaged sample.

The term "fade-resistant film" as used herein refers to a film whose $\Delta E_{ab}^*$ change is <5 after more than 300 MJ/m² of TUV in an accelerated weathering device. TUV is the Total UltraViolet irradiance intergrated over the band 295 nm-385 nm and time. A suitable accelerated weathering device is a xenon arc weathering device with daylight filters conforming to the requirements of ASTM Practice D7869 Annex A1 and operated in accordance with ASTM Practice G155.

Similarly, $\Delta$VLT values of <3% after more than 300 MJ/m^2 of TUV in an accelerated weathering device represent exceptional fade resistance. Where VLT is the Visible Light Transmittance as measured according to ASTM D1003-13 described previously.

The term "haze" as used herein refers to the percentage of transmitted light that deviates from the incident beam by more than 2.5° from the normal incident beam when passing through a material. As mentioned above, haze can be determined using, for example, the method of ASTM-D 1003-13.

The term "thermally durable" dye as used herein refers to a dye that is capable of withstanding conventional PET film extrusion processing conditions including temperatures up to 585 F (307 C) and residence times up to 15 minutes. Under those conditions, a thermally durable dye undergoes no appreciable degradation from a color or MW standpoint.

Figure 1:
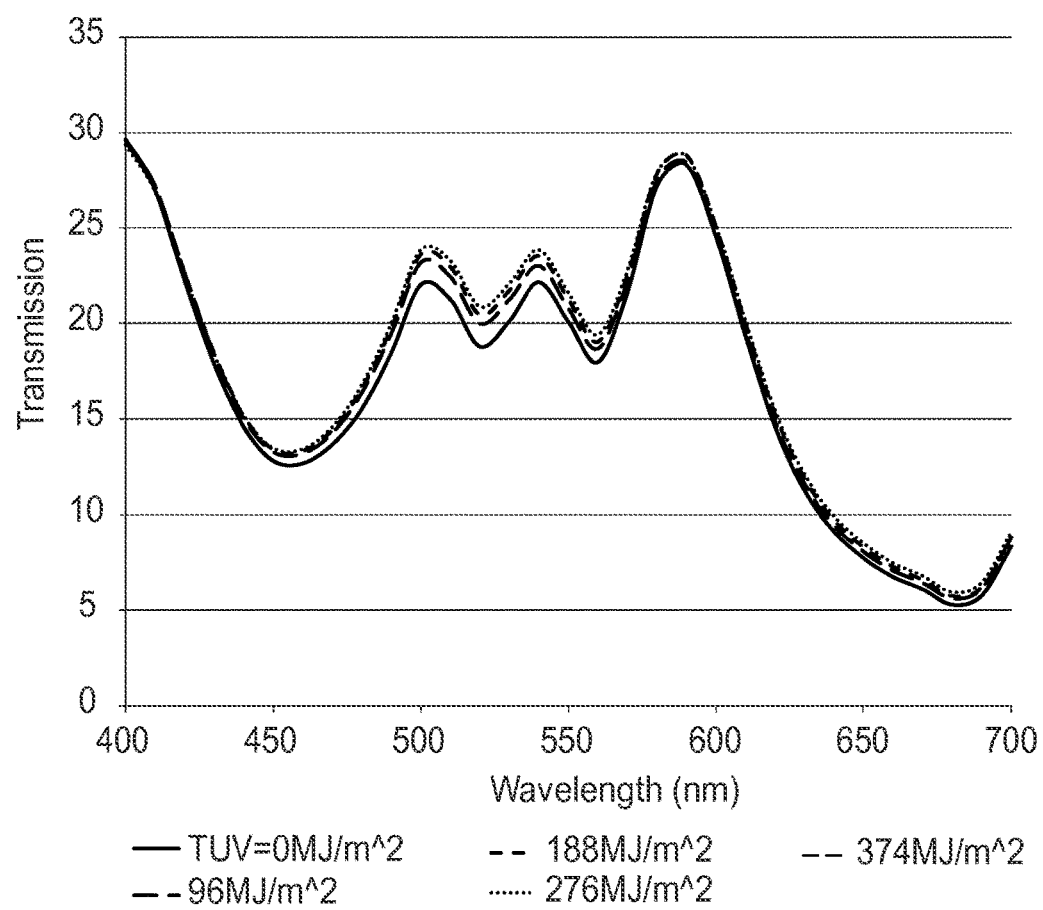
FIG. 1 contains spectra of a window film prepared according to Example 1 taken during accelerated weathering testing.

In the following description, reference is made to the accompanying drawings herein described. In certain cases, the Figures may depict, by way of illustration, several specific embodiments of the present disclosure. It is to be understood that other embodiments different from those explicitly depicted in the Figures are contemplated and may be made without departing from the scope or spirit of the present disclosure. The following detailed description, therefore, is not to be taken in a limiting sense.

DETAILED DESCRIPTION

In one embodiment, the present disclosure is directed to an optically clear encapsulated multilayer dyed film offering improved film processing and longer product performance in terms of fading and color retention. Fading and color change are long-standing problems that have plagued the tinted film industry since its inception. As mentioned before, films made via the solvent dip dyeing process are especially susceptible to fading.

In another embodiment, the present disclosure is directed to a film that comprises a core polyester layer comprising one or more dissolved thermally-durable dyes, and which is encapsulated by two clear layers (to which no dye or pigment has been added). In one embodiment, each of the encapsulating layers comprises a polyester, which may be the same or different as the polyester in the core layer. Each of the encapsulating layers may be the same or different in thickness and composition to the other encapsulating layer. In another embodiment, additional layers may be present between the core layer and one or both of the encapsulating layers, such as additional polyester layers or adhesive layers.

The inventors have observed various benefits resulting from the incorporation of the encapsulating layers on the dyed film and from using thermally-stable dyes that are unavailable in the dip dyeing process, such as: a) a cleaner manufacturing process due to preventing the dye(s) in the core layer from subliming out of the film and condensing on surrounding process equipment, and b) improved product durability based on the encapsulating layers containing the dyes within the multilayer construction and due to the use of thermally stable dyes not used before in the window-film industry. The end result is a dyed film with significant less color fading than comparable window films currently in the market.

In another embodiment, one or both of the encapsulating layers comprise slip particles, such as inorganic metal oxides (e.g., silica dioxide). In general, slip particles improve web handling and roll formation. However, prior to the disclosure of the present invention, the addition of slip particles to a thicker monolithic dyed window film might have resulted in unacceptable levels of haze, which would be a detriment for any optical film application. The use of the film construction disclosed herein allows the inclusion of the slip particles on a thin outer layer, which allows retention of the beneficial surface roughening properties of the slip while minimizing the undesirable haze.

Another advantage observed from using the films of the present disclosure is the reduction of dye sublimate that can coat processing equipment during manufacturing of an extruded dyed PET film. As observed by the inventors, a monolithic-PET extrusion process typically involves quenching a molten PET film on a chilled casting drum and is often assisted with electrostatic pinning to force intimate contact of the molten PET web to the chilled metal surface. As the molten PET undergoes a phase transition from liquid to solid, the inventors have observed that certain dyes tend to volatilize or sublime and recondense on surrounding process equipment including the die lip surface and the electrostatic pinning device. The rate of this sublimation and condensation process varies depending on output rate and process temperature, but may be high enough to force frequent downtime for cleaning the die lip and pinning device. If cleaning is not performed, unacceptable cosmetic defects including die and flow lines, and non-uniform pinning defects (chatter, chicken tracks, etc) may render the film unacceptable for optically clear (e.g., window film) applications. Furthermore, over the course of a multi-day production campaign, the dyes will sublime and condense within the tentering frame used to orient the PET film. Upon transitioning to another product, the tenter may require cleaning. Removal of these dyes from the tentering frame is a time consuming, solvent intensive operation and affects the ability of a PET manufacturer to rapidly turn the line around to make another product especially if the line is designated as a "clean room" environment. The inventors have observed that the drawbacks mentioned above are minimized and might even be eliminated when using an encapsulated dyed polyester film having one of the thermally-durable dyes disclosed in this application.

Although various features of the films described throughout the present description are illustrated as separate embodiments for ease of disclosure, the inventors contemplate that one or more of those separate embodiments may and should be combined to describe films within the scope of the instant disclosure.

In one embodiment, the present disclosure is directed to an optically clear window film comprising:
 a clear first outer layer comprising polyethylene terephthalate (PET),
 a dyed core layer comprising PET and one or more thermally-durable dyes chosen from anthraquinone dyes (e.g., Pigment Yellow 147, Solvent Yellow 163, Pigment Blue 60, Pigment Red 177), perylene dyes (e.g., Pigment Black 31, Pigment Black 32, Pigment Red 149, and quinacridone dyes (e.g., Pigment Red 122), and
 a clear second outer layer comprising PET, wherein the window film is fade-resistant after more than 300 MJ/m² of total irradiance integrated over the band 295 nm to 385 nm and time.

In certain embodiments, the window film is fade-resistant (i.e., shows a $\Delta E_{ab}^*$ value of less than 5) after more than 750 MJ/m² of total irradiance integrated over the band 295 nm to 385 nm and time.

In other embodiments, the $\Delta E_{ab}^*$ of the window film is less than 6, or less than 5, or less than 4, or less than 3, or less than 2, or less than 1 after more than 300 MJ/m² of total irradiance integrated over the band 295 nm to 385 nm and time. In other embodiments, the $\Delta E_{ab}^*$ of the window film is less than 6, or less than 5, or less than 4, or less than 3, or less than 2, or less than 1 after more than 500 MJ/m² of total irradiance integrated over the band 295 nm to 385 nm and time. In other embodiments, the $\Delta E_{ab}^*$ of the window film is less than 6, or less than 5, or less than 4, or less than 3, or less than 2, or less than 1 after more than 750 MJ/m² of total irradiance integrated over the band 295 nm to 385 nm and time.

In other embodiments, the $\Delta VLT$ of the window film is less than 5, or less than 4.5, or less than 4, or less than 3.5, or less than 3, or less than 2.5, or less than 2, or less than 1.5, or less than 1 after more than 300 MJ/m² of total irradiance integrated over the band 295 nm to 385 nm and time. In other embodiments, the $\Delta VLT$ of the window film is less than 5, or less than 4.5, or less than 4, or less than 3.5, or less than 3, or less than 2.5, or less than 2, or less than 1.5, or less than 1 after more than 500 MJ/m² of total irradiance integrated over the band 295 nm to 385 nm and time. In other embodiments, the $\Delta E_{ab}^*$ of the window film is less than 5, or less than 4.5, or less than 4, or less than 3.5, or less than 3, or less than 2.5, or less than 2, or less than 1.5, or less than 1 after more than 750 MJ/m² of total irradiance integrated over the band 295 nm to 385 nm and time.

In another embodiment, the present disclosure is directed to a process of making a dyed window film comprising:
providing molten polyethylene terephthalate (PET) for a core layer,
dissolving one or more thermally-durable dyes in the molten PET of the core layer,
providing molten PET for a first outer layer,
providing molten PET for a second outer layer,
coextruding the molten PET of the first outer layer, the molten PET of the core layer, and the molten PET of the second outer layer,
wherein the thermally-durable dyes are chosen from anthraquinone dyes (e.g., Pigment Yellow 147, Solvent Yellow 163, Pigment Blue 60, Pigment Red 177), perylene dyes (e.g., Pigment Black 31, Pigment Black 32, Pigment Red 149, and quinacridone dyes (e.g., Pigment Red 122).

In certain embodiments, the durable dyed polyester films of the present disclosure have a luminous transmittance of between 3 and 80 percent, or more preferably between 5 and 70 percent determined according to ASTM-D 1003-13.

In certain embodiments, the window films of this disclosure possess relatively low haze. A useful measure of the "haze" of an optical body can be determined from the percentage of light which, in passing through the body, deviates from the incident beam through forward scatter by more than a specified average degree. As mentioned previously, ASTM D1003-13 provides one method for making such a measurement. When the haze of a window film is determined against light scattering about the surface of the film exposed to air, the measured haze includes the haze caused by both surface and internal optical effects. This is considered the "total" haze for the film. The optical effects generated by the film itself internally, or "internal" haze, can be determined by measuring the haze of the film when it is immersed in a fluid of substantially similar refractive index. Unless otherwise specified, the haze values reported in this disclosure, including the claims, refer to the total haze of the film.

In one embodiment, the durable dyed polyester films of the present disclosure exhibits a haze value lower than 10%, or lower than 9%, or lower than 8%, or lower than 7%, or lower than 6%, or lower than 5%, or lower than 4%, or lower than 3%, or lower than 2%, or lower than 1% in the 400 nm to 700 nm wavelength range. The inventors intend the durable dyed polyester films of the present disclosure include those that have any of the previously recited values of luminous transmission combined with any of the previously recited values of haze. For example, durable dyed polyester films having a luminous transmission of between 3 and 80 percent and that exhibit a haze value lower than 5% in the 400 nm to 700 nm wavelength range, or having a luminous transmission of between 5 and 70% percent and that exhibit a haze value lower than 3% in the 400 nm to 700 nm wavelength range, to name a few, are within the scope of the present disclosure.

Thermally-Durable Dyes

Despite being the most widely available commercial alternative for tinted window film, films made by the dip-dyeing process have shown to have suboptimal fade-resistant characteristics in tests performed by the present inventors.

Figure 4:
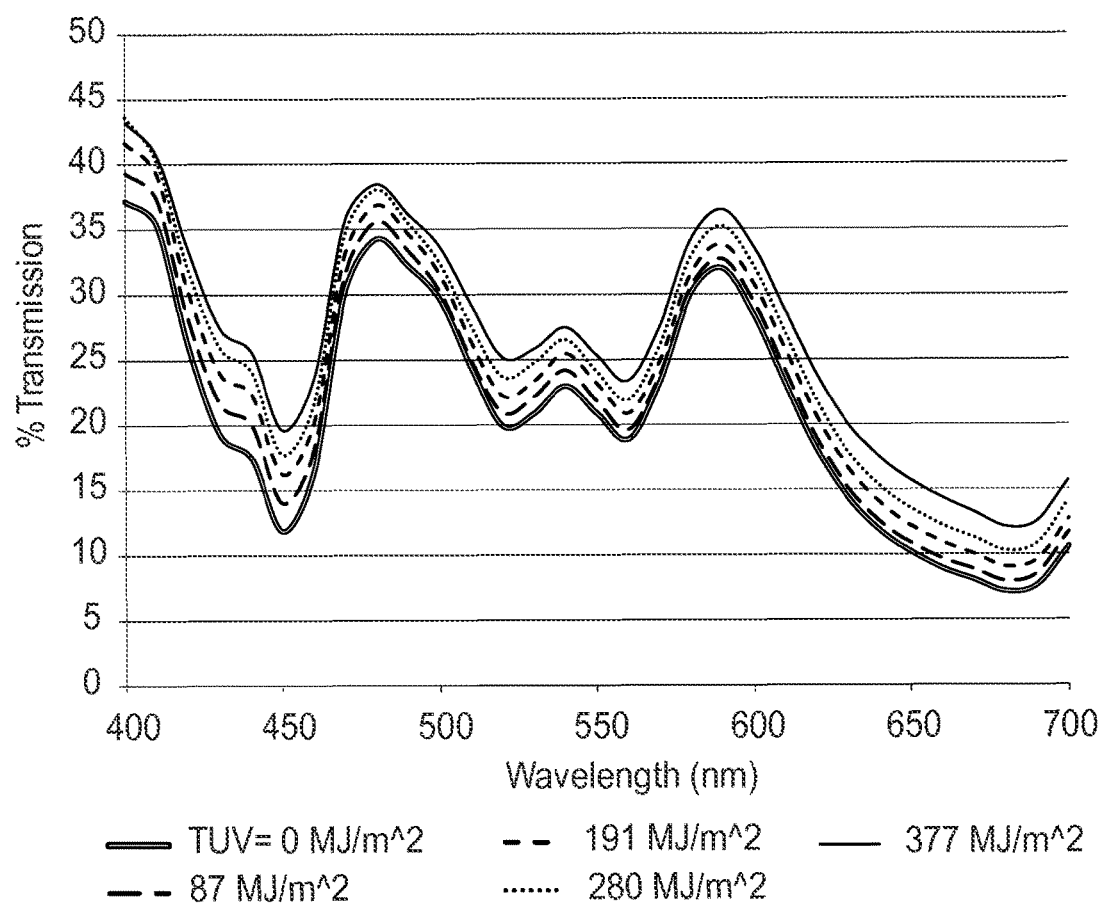
FIG. 4 contains spectra of Comparative Window Film 1 during accelerated weathering testing.
Figure 5:
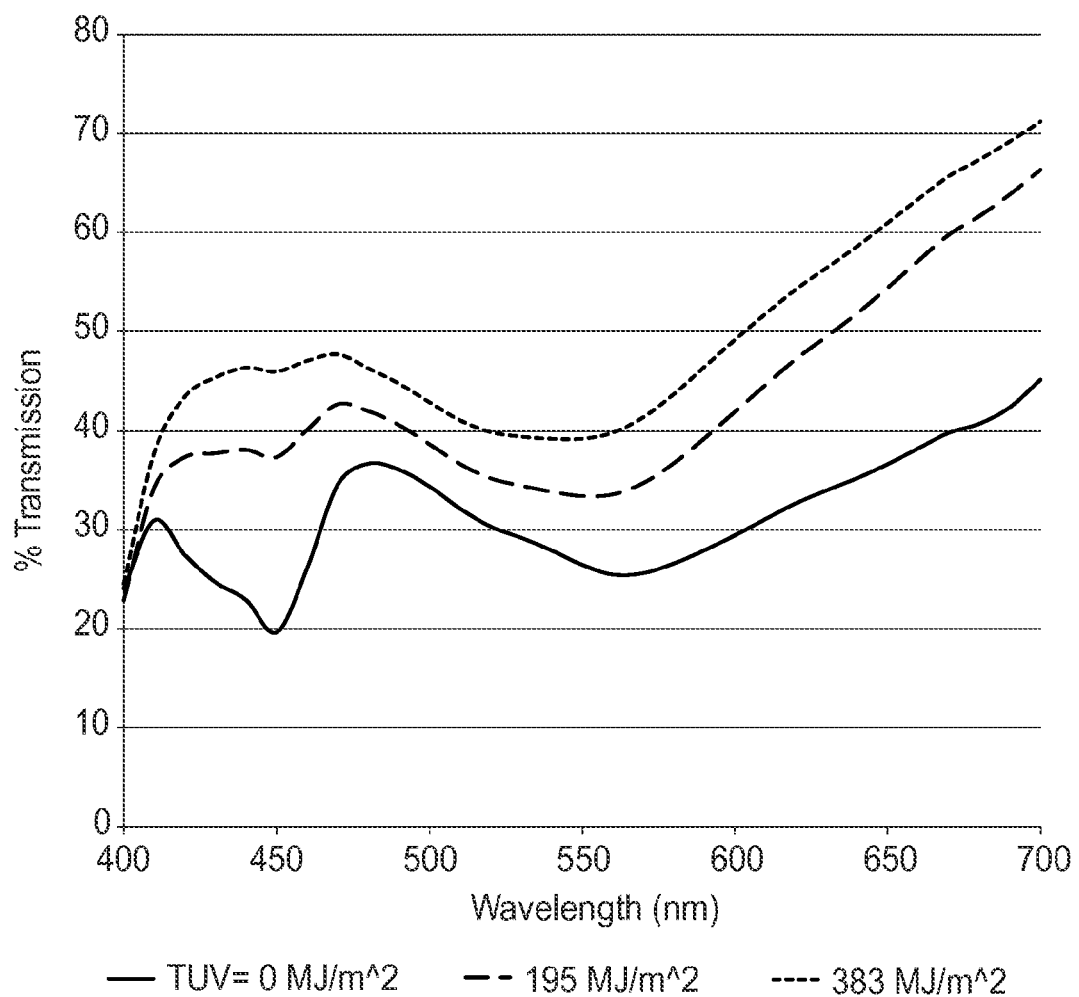
FIG. 5 contains spectra of Comparative Window Film 2 during accelerated weathering testing.

For example, FIGS. 4 and 5 represent accelerated ageing spectra of commercially available Window Films. The film in FIG. 4 (Comparative Window Film 1) was made with solvent dip dyed PET. The film in FIG. 5 (Comparative Window Film 2) is believed to be an extruded dyed PET film. In FIG. 4, the valley at around 450 nm corresponds to transmission due to the yellow dye, the peak at around 540 nm corresponds to the red dye, and the valley at around 680 nm corresponds to the blue dye.

As can be seen from those figures, visible light transmission increases as exposure to UV radiation increases for the tested films. This behavior translates, in practical terms, into lighter films with faded color after exposure to UV radiation, which occurs naturally for outdoor products. As part of one embodiment, the present disclosure addresses this problem by utilizing dyes that have not been previously used in optically-clear dyed films.

In general, the dyes of the present disclosure are soluble in the molten polyester resin of the core layer, such as molten PET resin. In another embodiment, the dyes do not precipitate out during the film forming and stretching conditions at the concentrations used in the film. In some embodiments, the dyes of the present disclosure do not require size reduction of the particles (as is normally required for some films comprising carbon black pigment) such as by milling or grinding, before they are mixed with the PET of the core layer. The core layer can contain one or more durable dyes. The concentration of each of the dyes present in the core layer is chosen independently of the concentration of each of the other dyes that may be present in that core layer. In one embodiment, the concentration of a single dye in the core layer is from 0.01 weight percent to 10 weight percent with respect to the composition of the core layer. In another embodiment, the concentration of a single dye in the core layer is from 0.01 weight percent to 5 weight percent with respect to the composition of the core layer. In other embodiments, the total concentration of the dyes in the core layer is from 0.01 weight percent to 15 weight percent with respect to the composition of the core layer. In other embodiments, the total concentration the dyes in the core layer is from 1 weight percent to 10 weight percent with respect to the composition of the core layer. In another embodiment, the concentration of a single dye in the core layer is chosen from less than 3%, less than 2%, and less than 1% with respect to the composition of the core layer.

In another embodiment, the dyes of the present disclosure are thermally durable and can withstand conditions during the extrusion process with minimal degradation. Typical processing conditions for dyed polyester films in the hands of the inventors include temperatures of about 540° F. and residence times of 5-15 minutes.

In another embodiment, the dyes of the present disclosure have vapor pressures that minimize sublimation after the dye has been dissolved in the molten polyester. Sublimation can still occur during the actual extrusion process, for example when the PET resin has not been dried before processing and is processed via twin screw extrusion under vacuum. Thus, in one embodiment, the dyes are large molecules that do not have significant vapor pressure at the extrusion conditions and are not subject to little to no sublimation. This desire for a large size may go against the desired for solubility in molten polyester, but the inventors have identified several dyes which meet all of the above requirements.

In certain embodiments, the durable dyes are chosen from as anthraquinone dyes (e.g., Pigment Yellow 147, Solvent Yellow 163, Pigment Blue 60, Pigment Red 177), perylene dyes (e.g., Pigment Black 31, Pigment Black 32, Pigment Red 149, and quinacridone dyes (e.g., Pigment Red 122)

In one embodiment, a durable dye is the yellow dye pigment yellow 147. Pigment yellow 147 is a dye that cannot be used in the conventional solvent dip dyeing process due to its limited solubility in the solvents used in the solvent dip dyeing process, such as monoether glycols. However, the present inventors have discovered that pigment yellow 147 has good solubility in molten PET resin. Pigment yellow 147 readily solubilizes during the PET film manufacturing process to provide durable, low-haze films.

In another embodiment, the durable dye is Yellow GHS (Solvent Yellow 163). In another embodiment, the durable dye is chosen from Pigment Blue 60, Pigment Red 177, Pigment Black 31, Pigment Black 32, Pigment Red 149, and Pigment Red 122).

Polyester Core Layer

In one embodiment, the polyester core layer comprises polyethylene terephthalate (PET). The skilled person would understand that various types of polyesters can be used in the durable films of the present disclosure. For example, useful polyester polymers include polymers having terephthalate or naphthalate comonomer units, for example, polyethylene naphthalate (PEN), polyethylene terephthalate (PET) and copolymers and blends thereof. Examples of other suitable polyester copolymers are provided in, for example, published patent application WO 99/36262 and in WO 99/36248, both of which are incorporated herein by reference for their disclosure of polyester copolymers. Other suitable polyester materials include polycarbonates, polyarylates, and other naphthalate and terephthalate-containing polymers, such as, for example, polybutylene naphthalate (PBN), polypropylene naphthalate (PPN), and blends and copolymers of the above with each other or with non-polyester polymers.

In one embodiment, the polyester core layer or the window film are oriented in one or both directions, depending on the particular set of properties desired. Typically, an oriented film is oriented after a quenching process in either or both the lengthwise (sometimes referred to as machine) direction and the transverse (or cross-machine) direction. Although the degree of orientation in either direction can vary greatly (and is not necessarily the same), typically stretching dimensions vary between 2.5 and 5.0 times the film's dimensions.

In one embodiment, the thickness of the core layer is chosen from 10 to 100 ums. In another embodiment, the core layer comprises one or more additives chosen from conventional ultraviolet absorbers (UVAs) and or IR absorbers to further enhance solar performance and product durability.

In certain embodiments, the polyester core layer with the desired dyes does not have one or both of the outer layers adjacent to it.

Outer Layers

In accordance with one embodiment of this disclosure, the core layer is encapsulated by two outer layers, defined herein as a first and second outer layers respectively. In this context, the outer layers encapsulate the core layer by each of the outer layers being adjacent to one of the two major surfaces of the core layer. In one embodiment, each of the outer layers comprises a polyester, which may the same or different in each outer layer, and the same or different as the polyester in the core layer. In another embodiment, the same copolymers used in the core layer can be used as components of each of the outer layers.

In one embodiment, the outer layers are intended to be the same to each other in composition and thickness. In other embodiments, each of the outer layers is different in composition and/or thickness to the other outer layer. Each of the outer layers, independently of the each other outer layer, can provide additional functionality to the window film, such as: a) retard dye migration and/or sublimation from the dyed core layer, b) modify surface roughness of both the core layer and the overall construction by using slip particles such as inorganic metal oxides for improved web handling and roll formation, c) improve barrier properties of the film by comprising a more crystalline polymer than in the core layer, d) modify the surface energy of the film to promote subsequent printing, coating or adhesive lamination operations, e) provide an outer layer to offer a non-oxidized surface for metallization, f) provide an outer layer that can be modified to provide improved initial adhesion to sputtered or evaporative metallization processes, g) impart scratch resistance, chemical resistance and/or increased weatherability, h) modify the clarity and haze of the film as desired for specific applications, and i) protect the layers underneath the outer layer(s) by using ultraviolet light absorbers (UVA).

Accordingly, in one embodiment, one or both of the outer layers comprise slip particles. In another embodiment, the slip particles are chosen from $SiO_2$, $CaCO_3$, and organic slip particles. In one embodiment, one or both of the outer layers are free of dyes and/or particulate pigments.

In some embodiments, each of the two outer layers and the core layer, independently of each other, may comprise a stabilizer such as a UV absorber (UVA) or hindered amine light stabilizer (HALS).

Ultraviolet absorbers function by preferentially absorbing ultraviolet radiation and dissipating it as thermal energy. Suitable UVAs may include: benzophenones (hydroxybenzophenones, e.g., Cyasorb 531 (Cytec)), benzotriazoles (hydroxyphenylbenzotriazoles, e.g., Cyasorb 5411, Tinuvin 329 (Ciba Geigy)), triazines (hydroxyphenyltriazines, e.g., Cyasorb 1164), oxanilides, (e.g., Sanuvor VSU (Clariant)) cyanoacrylates (e.g., Uvinol 3039 (BASF)), or benzoxazinones.

Suitable benzophenones include, CYASORB UV-9 (2-hydroxy-4-methoxybenzophenone, CHIMASSORB 81 (or CYASORB UV 531) (2 hydroxy-4 octyloxybenzophenone). Suitable benzotriazole UVAs include compounds available from Ciba, Tarrytown, N.Y. as TINUVIN P, 213, 234, 326, 327, 328, 405 and 571, and CYASORB UV 5411 and CYASORB UV 237. Other suitable UVAs include CYASORB UV 1164 (2-[4,6-bis(2,4-dimethylphenyl)-I,3,5-triazin-2yl]-5(octyloxy) phenol (an exemplary triazine) and CYASORB 3638 (an exemplary benzodiazine).

Hindered amine light stabilizers (HALS) are efficient stabilizers against light-induced degradation of most polymers. HALS do not generally absorb UV radiation, but act to inhibit degradation of the polymer. HALS typically include tetra alkyl piperidines, such as 2,2,6,6-tetramethyl-4-piperidinamine and 2,2,6,6-tetramethyl-4-piperidinol. Other suitable HALS include compounds available from Ciba, Tarrytown, N.Y. as TINUVIN 123, 144, and 292.

The UVAs and HALS disclosed explicitly here are intended to be examples of materials corresponding to each of these two categories of additives. The present inventors contemplate that other materials not disclosed here but known to those skilled in the art for their properties as UV absorbers or hindered amine light stabilizers can be used in the durable dyed polyester films of this disclosure.

Improved product performance relative to metallized solvent dip dyed films or metallized monolithic dyed films is once again based on the improved barrier properties of the skin layers. Solvent dip dyed films contain residual solvent as a result of the solvent immersion dyeing process. The residual solvent slowly migrates into or near the metal layer and creates an oxidation site on the metal which will affect the film's appearance by changing the transmission characteristics or the color of the metal oxide.

In another embodiment, each of the outer layers, independently of each other, comprises one or more additives chosen from UV stabilizers and anti-oxidizers.

Each of the outer layers can be coextruded along with the core layer to produce a film that has at least three layers. In one embodiment, one or more intermediate layers (which itself can be one of films, laminates, and/or coatings) are coextruded between one or both of the outer layers and the core layer containing the durable dye. In one embodiment, each of the outer layers, independently of the other, is made of a transparent polymer, for example, a polyester (the same or different as that used in the construction of the core layer), polyolefin, polycarbonate, or other thermoplastic polymer. In certain embodiments, there are no intermediate layers between one or both of the outer layers and the core layer.

In another embodiment, the outer layers can be coated or laminated onto the core layer using a suitable pressure sensitive or non-pressure sensitive adhesive. Suitable coatings include, but are not limited to, hardcoats, adhesives, antistatics, adhesion promoting primers, UV stabilizing coatings, friction reduction layers, etc.

In one embodiment, the thickness of the each of the first and second outer layers, independently of each other, is chosen from 1 to 10 um.

The present inventors have observed that the presence of the outer layers, which may comprise a more crystalline form of PET than in the core layer, reduces dye migration when the film is applied to a glazing thereby increasing the product lifetime, reducing fading, and increasing light fastness (e.g., constant light transmission) of these films.

In another embodiment, only one of the outer layers is present in the films of this disclosure. In certain embodiments, one or both of the outer layers contain no added dyes or pigments intended to impart color to the layer. In most typical uses of the window films according to this disclosure, both outer layers comprise no added pigments or dyes. However, the skilled person would understand that addition of certain pigments or dyes in concentrations that do not detract from the overall functionality of the window film is possible and the inventors consider such modification to be within the scope of the present disclosure.

Protective Layer

The protective layer is optional. In certain embodiments, in order to protect the window film, the exposed surface of the film can be protected with an additional layer that can be coated, co-extruded, or laminated onto the first outer layer, when present, or onto the core layer (if not outer layer is present), or onto any other layer adjacent the core layer facing the sun. In one embodiment, the first outer layer can be coated with a scratch and wear resistant hardcoat. The hardcoat layer can improve the durability and weatherability of the window film during processing and during use of the end product. The hardcoat layer can include any useful material, such as acrylic hardcoats, silica-based hardcoats, siloxane hardcoats, melamine hardcoats, and the like. In the case of acrylic hardcoats, the hardcoat can contain one or more acrylic polymers. Acrylic polymers include acrylates, methacrylates, and their copolymers. The hardcoat can be any useful thickness such as, for example, from 1 to 20 micrometers, or 1 to 10 micrometers, or 1 to 5 micrometers, or from 5 to 10 micrometers, or from 8 to 12 micrometers. In another embodiment, the thickness of the hardcoat is 3 micrometers.

In one embodiment, the hardcoat layer can include UV stabilizers (see other sections of this application), anti-oxidizers, and any crosslinking agents and initiators necessary to cure the hardcoat polymers. In one embodiment, the hardcoat comprises from 1 to 7% of UV stabilizers (weight percent with respect to the hardcoat composition). In another embodiment, the hardcoat comprises from 2 to 6% of UV stabilizers (weight percent). In other embodiments, the hardcoat comprises 6% or less, or 5% or less, or 4% or less, or 3% or less of UV stabilizers in weight percent. The nature of the hardcoat or any other protective layer is not critical to the performance of the window film and the inventors envision that known clear hardcoats or protective layers may be used adjacent the first outer layer of the window film.

Adhesives

Adhesive compositions suitable to be used with or in window films are well known to those of ordinary skill in the art. In certain embodiments, the adhesives used in the films of the present disclosure include heat activated adhesives and pressure sensitive adhesives (PSAs). Heat activated adhesives are non-tacky at room temperature but become tacky and capable of bonding to a substrate at elevated temperatures. These adhesives usually have a glass transition temperature (Tg) or melting point (Tm) above room temperature. When the temperature is elevated above the Tg or Tm, the storage modulus usually decreases and the adhesive becomes tacky.

Pressure sensitive adhesives suitable to be used in the instant films possess properties at room temperature including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power.

The pressure sensitive adhesives may be (meth)acrylate-based pressure sensitive adhesives. Useful alkyl (meth) acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methyl-butyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

The products of this disclosure are typically used in window films, in which the product is exposed to sunlight, usually behind glass, for long periods of time, potentially up to ten or more years. Therefore, it is important to understand the durability of the color of the film, and to know whether the dyes will fade slowly over time during exposure to sunlight. For practical reasons, this durability is normally assessed by artificial accelerated weathering. The dyed extruded films of the current disclosure have been exposed to accelerated weathering and compared to known controls and existing know dyed films.

Exemplary Embodiments

1. An optically clear window film comprising
    a clear first outer layer comprising polyethylene terephthalate (PET),
    a dyed core layer comprising PET and one or more dyes chosen from anthraquinone dyes, perylene dyes, and quinacridone dyes, and
    a clear second outer layer comprising PET,
    wherein the window film is fade-resistant after more than 300 MJ/m² of total irradiance integrated over the band 295 nm to 385 nm and time.
2. The window film as described in embodiment 1, wherein the window film is fade-resistant after more than 750 MJ/m² of total irradiance integrated over the band 295 nm to 385 nm and time.
3. The window film as described in any of the preceding embodiments, wherein window film has a ΔEab* value of less than 6 after more than 300 MJ/m2 of total irradiance integrated over the band 295 nm to 385 nm and time.
4. The window film as described in any of the preceding embodiments, wherein window film has a ΔEab* value of less than 6 after more than 500 MJ/m2 of total irradiance integrated over the band 295 nm to 385 nm and time.
5. The window film as described in any of the preceding embodiments, wherein window film has a ΔEab* value of less than 6 after more than 750 MJ/m2 of total irradiance integrated over the band 295 nm to 385 nm and time.
6. The window film as described in any of the preceding embodiments, wherein the ΔVLT of the window film is less than 5 after more than 300 MJ/m2 of total irradiance integrated over the band 295 nm to 385 nm and time.
7. The window film as described in any of the preceding embodiments, wherein the ΔVLT of the window film is less than 5 after more than 500 MJ/m2 of total irradiance integrated over the band 295 nm to 385 nm and time.
8. The window film as described in any of the preceding embodiments, wherein the ΔVLT of the window film is less than 5 after more than 750 MJ/m2 of total irradiance integrated over the band 295 nm to 385 nm and time.
9. The window film as described in any of the preceding embodiments, wherein each of the first and second outer layers comprises no added dyes and no added pigments.
10. The window film as described in any of the preceding embodiments, wherein the dye is soluble in molten PET of the core layer.
11. The window film as described in any of the preceding embodiments, wherein the dye is chosen from Pigment Yellow 147, Solvent Yellow 163, Pigment Red 177, Pigment Blue 60, Pigment Black 31, Pigment Red 149, and Pigment Red 122.
12. The window film as described in any of the preceding embodiments, wherein the dye is Pigment Yellow 147.
13. The window film as described in any of the preceding embodiments, wherein the dye is Solvent Yellow 163.
14. The window film as described in any of the preceding embodiments, wherein the dye is Pigment Red 177.
15. The window film as described in any of the preceding embodiments, wherein the dye is Pigment Blue 60.
16. The window film as described in any of the preceding embodiments, wherein the dye is Pigment Black 31.
17. The window film as described in any of the preceding embodiments, wherein the dye Pigment Red 149
18. The window film as described in any of the preceding embodiments, wherein the dye is Pigment Red 122.
19. The window film as described in any of the preceding embodiments, wherein the total concentration the dyes in the core layer is from 0.01 weight percent to 15 weight percent with respect to the composition of the core layer.
20. The window film as described in any of the preceding embodiments, wherein the total concentration the dyes in the core layer is from 1 weight percent to 10 weight percent with respect to the composition of the core layer.
21. The window film as described in any of the preceding embodiments, further comprising a clear hardcoat layer and/or a pressure-sensitive adhesive layer.
22. The window film as described in any of the preceding embodiments, further comprising slip particles in at least one of the first or second outer layers.
23. The window film as described in embodiment 22, wherein the slip particles are chosen from $SiO_2$, $CaCO_3$, and organic slip particles.
24. The window film as described in embodiment 22 or embodiment 23, wherein the slip particles are chosen from $SiO_2$ particles.
25. The window film as described in any of the preceding embodiments, wherein the haze of the window film is below 5%.
26. The window film as described in any of the preceding embodiments, wherein each of the first and second outer layers, independently of each other, further comprises one or more UV stabilizers, and wherein the core layer further comprises one or more UV stabilizers
27. The window film as described in any of the preceding embodiments, wherein the first outer layer, the core layer, and the second outer layer are coextruded.
28. The window film as described in any of the preceding embodiments, wherein the PET in each of the first and second outer layers and the core layer is the same PET.

29. A process of making a dyed window film comprising:
   providing molten polyethylene terephthalate (PET) for a core layer,
   dissolving one or more dyes in the molten PET of the core layer,
   providing molten PET for a first outer layer,
   providing molten PET for a second outer layer,
   coextruding the molten PET of the first outer layer, the molten PET of the core layer, and the molten PET of the second outer layer,
   wherein the dyes are chosen from anthraquinone dyes, perylene dyes, and quinacridone dyes.

30. The process as described in embodiment 29, wherein the window film is fade-resistant after more than 300 MJ/m$^2$ of total irradiance integrated over the band 295 nm to 385 nm and time, wherein the window film is fade-resistant after more than 300 MJ/m$^2$ of total irradiance integrated over the band 295 nm to 385 nm and time.

31. The process as described in any of the preceding embodiments directed to a process, wherein the window film is fade-resistant after more than 750 MJ/m$^2$ of total irradiance integrated over the band 295 nm to 385 nm and time.

32. The process as described in any of the preceding embodiments directed to a process, wherein window film has a ΔEab* value of less than 6 after more than 300 MJ/m2 of total irradiance integrated over the band 295 nm to 385 nm and time.

33. The process as described in any of the preceding embodiments directed to a process, wherein window film has a ΔEab* value of less than 6 after more than 500 MJ/m2 of total irradiance integrated over the band 295 nm to 385 nm and time.

34. The process as described in any of the preceding embodiments directed to a process, wherein window film has a ΔEab* value of less than 6 after more than 750 MJ/m2 of total irradiance integrated over the band 295 nm to 385 nm and time.

35. The process as described in any of the preceding embodiments directed to a process, wherein the ΔVLT of the window film is less than 5 after more than 300 MJ/m2 of total irradiance integrated over the band 295 nm to 385 nm and time.

36. The process as described in any of the preceding embodiments directed to a process, wherein the ΔVLT of the window film is less than 5 after more than 500 MJ/m2 of total irradiance integrated over the band 295 nm to 385 nm and time.

37. The process as described in any of the preceding embodiments directed to a process, wherein the ΔVLT of the window film is less than 5 after more than 750 MJ/m2 of total irradiance integrated over the band 295 nm to 385 nm and time.

38. The process as described in any of the preceding embodiments directed to a process, wherein each of the first and second outer layers comprises no added dyes and no added pigments.

39. The process as described in any of the preceding embodiments directed to a process, wherein the dye is chosen from Pigment Yellow 147, Solvent Yellow 163, Pigment Red 177, Pigment Blue 60, Pigment Black 31, Pigment Red 149, and Pigment Red 122.

40. The process as described in any of the preceding embodiments directed to a process, wherein the dye is Pigment Yellow 147.

41. The window film as described in any of the preceding embodiments, wherein the dye is Solvent Yellow 163.

42. The window film as described in any of the preceding embodiments, wherein the dye is Pigment Red 177.

43. The window film as described in any of the preceding embodiments, wherein the dye is Pigment Blue 60.

44. The window film as described in any of the preceding embodiments, wherein the dye is Pigment Black 31.

45. The window film as described in any of the preceding embodiments, wherein the dye Pigment Red 149.

46. The process as described in any of the preceding embodiments directed to a process, wherein the dye is Pigment Red 122.

47. The process as described in any of the preceding embodiments directed to a process, wherein the total concentration of the dyes in the core layer is from 0.01 weight percent to 15 weight percent.

48. The process as described in any of the preceding embodiments directed to a process, wherein the total concentration of the dyes in the core layer is from 1 weight percent to 10 weight percent.

49. The process as described in any of the preceding embodiments directed to a process, further comprising providing a clear hardcoat layer on the window film.

50. The process as described in any of the preceding embodiments directed to a process, further comprising providing a pressure-sensitive adhesive layer on the window film.

51. The process as described in any of the preceding embodiments directed to a process, further comprising slip particles in at least one of the first or second outer layers.

52. The process as described in embodiment 51, wherein the slip particles are chosen from SiO$_2$, CaCO$_3$, and organic slip particles.

53. The process as described in embodiment 51 or embodiment 52, wherein the slip particles are chosen from SiO$_2$ particles.

54. The process as described in any of the preceding embodiments directed to a process, wherein the haze of the window film is below 5%.

55. The process as described in any of the preceding embodiments directed to a process, wherein each of the first and second outer layers, independently of each other, further comprises one or more UV stabilizers, and wherein the core layer further comprises one or more additives chosen from UV stabilizers.

56. The process as described in any of the preceding embodiments directed to a process, wherein the PET in each of the first and second outer layers and the core layer is the same PET.

57. An optically clear window film comprising
   a dyed core layer comprising PET and one or more dyes chosen from anthraquinone dyes, perylene dyes, and quinacridone dyes, and
   wherein the window film is fade-resistant after more than 300 MJ/m$^2$ of total irradiance integrated over the band 295 nm to 385 nm and time.

58. The window film as described in any of the preceding embodiments, wherein the window film is fade-resistant after more than 750 MJ/m$^2$ of total irradiance integrated over the band 295 nm to 385 nm and time.

59. The window film as described in any of the preceding embodiments, wherein window film has a ΔEab* value of less than 6 after more than 300 MJ/m2 of total irradiance integrated over the band 295 nm to 385 nm and time.

60. The window film as described in any of the preceding embodiments, wherein window film has a ΔEab* value of less than 6 after more than 500 MJ/m2 of total irradiance integrated over the band 295 nm to 385 nm and time.
61. The window film as described in any of the preceding embodiments, wherein window film has a ΔEab* value of less than 6 after more than 750 MJ/m2 of total irradiance integrated over the band 295 nm to 385 nm and time.
62. The window film as described in any of the preceding embodiments, wherein the ΔVLT of the window film is less than 5 after more than 300 MJ/m2 of total irradiance integrated over the band 295 nm to 385 nm and time.
63. The window film as described in any of the preceding embodiments, wherein the ΔVLT of the window film is less than 5 after more than 500 MJ/m2 of total irradiance integrated over the band 295 nm to 385 nm and time.
64. The window film as described in any of the preceding embodiments, wherein the ΔVLT of the window film is less than 5 after more than 750 MJ/m2 of total irradiance integrated over the band 295 nm to 385 nm and time.
65. The window film as described in any of the preceding embodiments, wherein the dye is soluble in molten PET of the core layer.
66. The window film as described in any of the preceding embodiments, wherein the dye is chosen from Pigment Yellow 147, Solvent Yellow 163, Pigment Red 177, Pigment Blue 60, Pigment Black 31, Pigment Red 149, and Pigment Red 122.
67. The window film as described in any of the preceding embodiments, wherein the dye is Pigment Yellow 147.
68. The window film as described in any of the preceding embodiments, wherein the dye is Solvent Yellow 163.
69. The window film as described in any of the preceding embodiments, wherein the dye is Pigment Red 177.
70. The window film as described in any of the preceding embodiments, wherein the dye is Pigment Blue 60.
71. The window film as described in any of the preceding embodiments, wherein the dye is Pigment Black 31.
72. The window film as described in any of the preceding embodiments, wherein the dye Pigment Red 149.
73. The window film as described in any of the preceding embodiments, wherein the dye is Pigment Red 122.
74. The window film as described in any of the preceding embodiments, wherein the total concentration of the dyes in the core layer is from 0.01 weight percent to 15 weight percent with respect to the composition of the core layer.
75. The window film as described in any of the preceding embodiments, wherein the total concentration of the dyes in the core layer is from 1 weight percent to 10 weight percent with respect to the composition of the core layer.
76. The window film as described in any of the preceding embodiments, further comprising a clear hardcoat layer and/or a pressure-sensitive adhesive layer.
77. The window film as described in any of the preceding embodiments, further comprising slip particles in the core layers.
78. The window film as described in embodiment 77, wherein the slip particles are chosen from $SiO_2$, $CaCO_3$, and organic slip particles.
79. The window film as described in embodiment 77 or embodiment 78, wherein the slip particles are chosen from $SiO_2$ particles.
80. The window film as described in any of the preceding embodiments, wherein the haze of the window film is below 5%.
81. The window film as described in any of the preceding embodiments, wherein the core layer further comprises one or more UV stabilizers.
82. The window film as described in any of the preceding embodiments, wherein the core layer is extruded.
83. A process of making a dyed window film comprising:
providing molten polyethylene terephthalate (PET) for a core layer,
dissolving one or more dyes in the molten PET of the core layer,
extruding the molten PET of the core layer,
wherein the dyes are chosen from anthraquinone dyes, perylene dyes, and quinacridone dyes.
84. The process as described in embodiment 83, wherein the window film is fade-resistant after more than 300 $MJ/m^2$ of total irradiance integrated over the band 295 nm to 385 nm and time, wherein the window film is fade-resistant after more than 300 $MJ/m^2$ of total irradiance integrated over the band 295 nm to 385 nm and time.
85. The process as described in any of the preceding embodiments directed to a process, wherein the window film is fade-resistant after more than 750 $MJ/m^2$ of total irradiance integrated over the band 295 nm to 385 nm and time.
86. The process as described in any of the preceding embodiments directed to a process, wherein window film has a ΔEab* value of less than 6 after more than 300 MJ/m2 of total irradiance integrated over the band 295 nm to 385 nm and time.
87. The process as described in any of the preceding embodiments directed to a process, wherein window film has a ΔEab* value of less than 6 after more than 500 MJ/m2 of total irradiance integrated over the band 295 nm to 385 nm and time.
88. The process as described in any of the preceding embodiments directed to a process, wherein window film has a ΔEab* value of less than 6 after more than 750 MJ/m2 of total irradiance integrated over the band 295 nm to 385 nm and time.
89. The process as described in any of the preceding embodiments directed to a process, wherein the ΔVLT of the window film is less than 5 after more than 300 MJ/m2 of total irradiance integrated over the band 295 nm to 385 nm and time.
90. The process as described in any of the preceding embodiments directed to a process, wherein the ΔVLT of the window film is less than 5 after more than 500 MJ/m2 of total irradiance integrated over the band 295 nm to 385 nm and time.
91. The process as described in any of the preceding embodiments directed to a process, wherein the ΔVLT of the window film is less than 5 after more than 750 MJ/m2 of total irradiance integrated over the band 295 nm to 385 nm and time.
92. The process as described in any of the preceding embodiments directed to a process, wherein the dye is chosen from Pigment Yellow 147, Solvent Yellow 163, Pigment Red 177, Pigment Blue 60, Pigment Black 31, Pigment Red 149, and Pigment Red 122.
93. The process as described in any of the preceding embodiments directed to a process, wherein the dye is Pigment Yellow 147.
94. The window film as described in any of the preceding embodiments, wherein the dye is Solvent Yellow 163.
95. The window film as described in any of the preceding embodiments, wherein the dye is Pigment Red 177.
96. The window film as described in any of the preceding embodiments, wherein the dye is Pigment Blue 60.
97. The window film as described in any of the preceding embodiments, wherein the dye is Pigment Black 31.

98. The window film as described in any of the preceding embodiments, wherein the dye Pigment Red 149.
99. The process as described in any of the preceding embodiments directed to a process, wherein the dye is Pigment Red 122.
100. The process as described in any of the preceding embodiments directed to a process, wherein the total concentration of the dyes in the core layer is from 0.01 weight percent to 15 weight percent.
101. The process as described in any of the preceding embodiments directed to a process, wherein the total concentration of the dyes in the core layer is from 1 weight percent to 10 weight percent.
102. The process as described in any of the preceding embodiments directed to a process, further comprising providing a clear hardcoat layer on the window film.
103. The process as described in any of the preceding embodiments directed to a process, further comprising providing a pressure-sensitive adhesive layer on the window film.
104. The process as described in any of the preceding embodiments directed to a process, further comprising slip particles in the core layer.
105. The process as described in embodiment 104, wherein the slip particles are chosen from $SiO_2$, $CaCO_3$, and organic slip particles.
106. The process as described in embodiment 104 or embodiment 105, wherein the slip particles are chosen from $SiO_2$ particles.
107. The process as described in any of the preceding embodiments directed to a process, wherein the haze of the window film is below 5%.
108. The process as described in any of the preceding embodiments directed to a process, wherein the core layer further comprises one or more UV stabilizers.

EXAMPLES

All of the color masterbatches were made by Penn Color Corporation (Doylestown, Pa.). Values of $\Delta E_{ab}$ are unitless. Values of $\Delta VLT$ are in units of percent transmission.

Sources of Materials:

| Common name or abbreviation | Trade name | Source |
| --- | --- | --- |
| PET resin | Tairilin 1N404 | Nanya |
| Acrylic PSA | 8171CL | 3M Corp., St. Paul, MN |
| Acrylic PSA containing UVA | 8171PCL | 3M Corp., St. Paul, MN |
| Slip Agent | Aerosil OX 50 | Evonik Corp., Parsippany, NJ |
| Disperse Red 60 | Red 60 | Keystone Aniline Corp., Chicago, IL |
| Disperse Blue 60 | Blue BGL | Keystone Aniline Corp., Chicago, IL |
| Pigment Yellow 147 | Yellow RNB | Keystone Aniline Corp., Chicago, IL |
| Solvent Yellow 163 | Yellow GHS | ColorChem Int'l Corp., Atlanta, GA |
| Pigment Black 31 | Lumogen 4280 | BASF Corp., Florham Park, NJ |
| Pigment Blue 60 | 66S4754 | Penn Color Corporation, Hatsfield, PA |
| Pigment Red 149 | 66R4890 | Penn Color Corporation, Hatsfield, PA |
| Pigment Red 122 | 66R4889 | Penn Color Corporation, Hatsfield, PA |
| Pigment Red 177 | 66R5321 | Penn Color Corporation, Hatsfield, PA |
| Solvent Red 135 | Red G | ColorChem Int'l Corp., Atlanta, GA |
| Ceres Blue | Ceres Blue 3R | Lanxess Corp, Pittsburgh, PA |

Test Methods

Weathering Test:

Window films were prepared for weathering by laminating the dyed PET film to an acrylic PSA and bonding this PSA to a 3 mm glass substrate. Specific types of dyed PET film are described in the Examples. The glass laminated window films were exposed with the glass-side facing the light source in a xenon arc weathering device such that the light passes through the glass and PSA prior to the dyed PET film. The PSA may or may not contain UVA, as described in the examples. The xenon arc weathering device uses daylight filters conforming to the requirements of ASTM Practice D7869 Annex A1 and operated in accordance with ASTM Practice G155. The total ultraviolet dosage (TUV, total irradiance integrated over the band 295-385 nm and time) is indicated in $MJ/m^2$. Results are reported as transmission over time. $\Delta VLT$ and $\Delta E_{ab}$ values are reported with respect to values at the end of the weathering testing (difference between values at highest TUV and TUV=0).

Example 1

Production of a Dyed Window Film in which the Yellow Dye is Pigment Yellow 147

A monolithic PET film was extruded and processed in a normal Polyester film processing manner. The resin feed rates consisted of the following;

| Material | % of input |
| --- | --- |
| Clear PET | 67.2% |
| Slip masterbatch | 11.5% |
| Red masterbatch | 4.9% |
| Blue masterbatch | 10.5% |
| Yellow masterbatch | 5.9% |

Clear PET resin had an IV of 0.62, the slip in the slip masterbatch (which was internally produced) was Aerosil OX 50 (Evonik Corporation, Parsippany, N.J.) at a loading level of 3.0 weight percent (wt %) in PET. The red masterbatch was 10 wt % Disperse Red 60, the blue masterbatch was 10 wt % Disperse Blue 60 and the yellow masterbatch contained 10 wt % Pigment Yellow 147, all in PET.

The materials were fed and processed via twin screw extrusion under vacuum. The resulting cast film was stretched approximately 3.3 in the machine direction and 3.5 in the transverse direction and the resulting thickness was about 23 microns. Initial haze of the film was 2.2%.

The film of this example was then laminated to a UVA-containing PSA as described previously and submitted to a weathering test as described above. Results are shown in FIG. 1.

Example 2

Production of a Window Film in which the Yellow Pigment is Solvent Yellow 163

A cast polyester film was produced and then later batch stretched to produce the described film sample. The input materials were as follows.

| Material | grams | Trade name | Vendor |
| --- | --- | --- | --- |
| Solvent Yellow 163 | 37.9 | Yellow GHS | ColorChem |
| Disperse Blue 60 | 26.6 | Blue BGL | Keystone |

-continued

| Material | grams | Trade name | Vendor |
| --- | --- | --- | --- |
| Disperse Red 60 | 18.4 | Red 60 | Keystone |
| Clear PET | 4536 | Tairilin 1N404 | Nanya |

The materials were placed in a plastic bag and mixed to evenly distribute the dye powders among the resin pellets. They were then fed into a twin screw extruder and processed at a melt temperature of 551° F. The molten PET was cast upon a chilled roll to produce a cast film of about 12 mils in thickness. The cast film was then subsequently batch stretched to produce an oriented film of about 25 microns thickness. The stretching conditions are noted below.

| Draw Ratio MD × TD | Preheat Temperature | Preheat time | Stretch Temperature | Stretch Speed constant speed |
| --- | --- | --- | --- | --- |
| 3.5 × 3.5 | 100° C. | 30 s | 100° C. | 50%/second |

Figure 2:
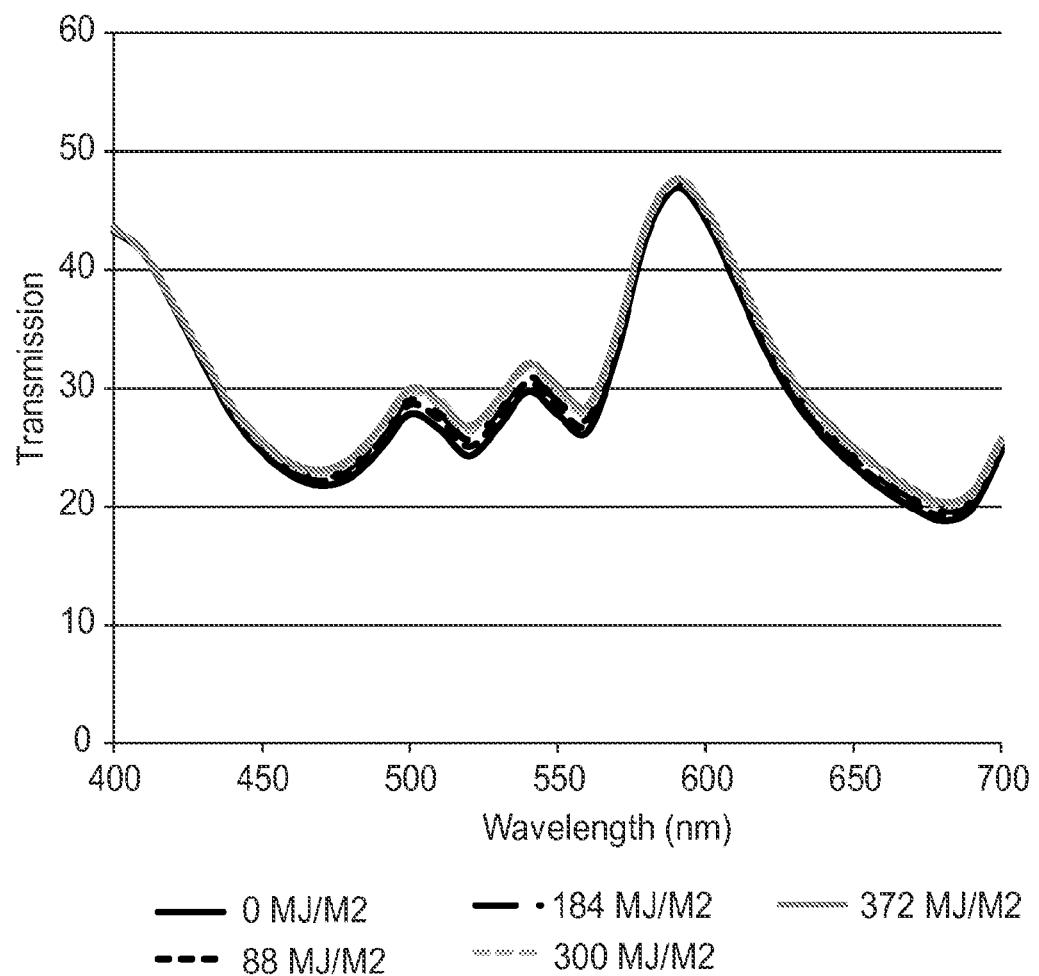
FIG. 2 contains spectra of the window film prepared according to Example 2 taken during accelerated weathering testing.

The resulting window film was laminated to a UVA-containing PSA as described previously, and submitted to the weathering test as described above. Results are shown in FIG. 2.

Example 3

Production of a Multilayer Coextruded PET Film in which the Yellow Pigment is Pigment Yellow 147

A film was prepared as described in Example 1, except that the film was a multilayer coextruded film. The resulting coextruded window film construction was extruded and processed in a normal Polyester film processing manner. The resin feed rates consisted of two extruders at the following conditions:

Extruder 1—Split equally between the two outer layers (11.5% of total feed rate)

| Material | % of input |
| --- | --- |
| Clear PET | 86.2% |
| Slip masterbatch | 13.8% |

Extruder 2—Inner Layer (88.5% of total feed rate)

| Material | % of input |
| --- | --- |
| Clear PET | 74.9% |
| Red masterbatch | 5.6% |
| Blue masterbatch | 12.3% |
| Yellow masterbatch | 7.2% |

Figure 3:
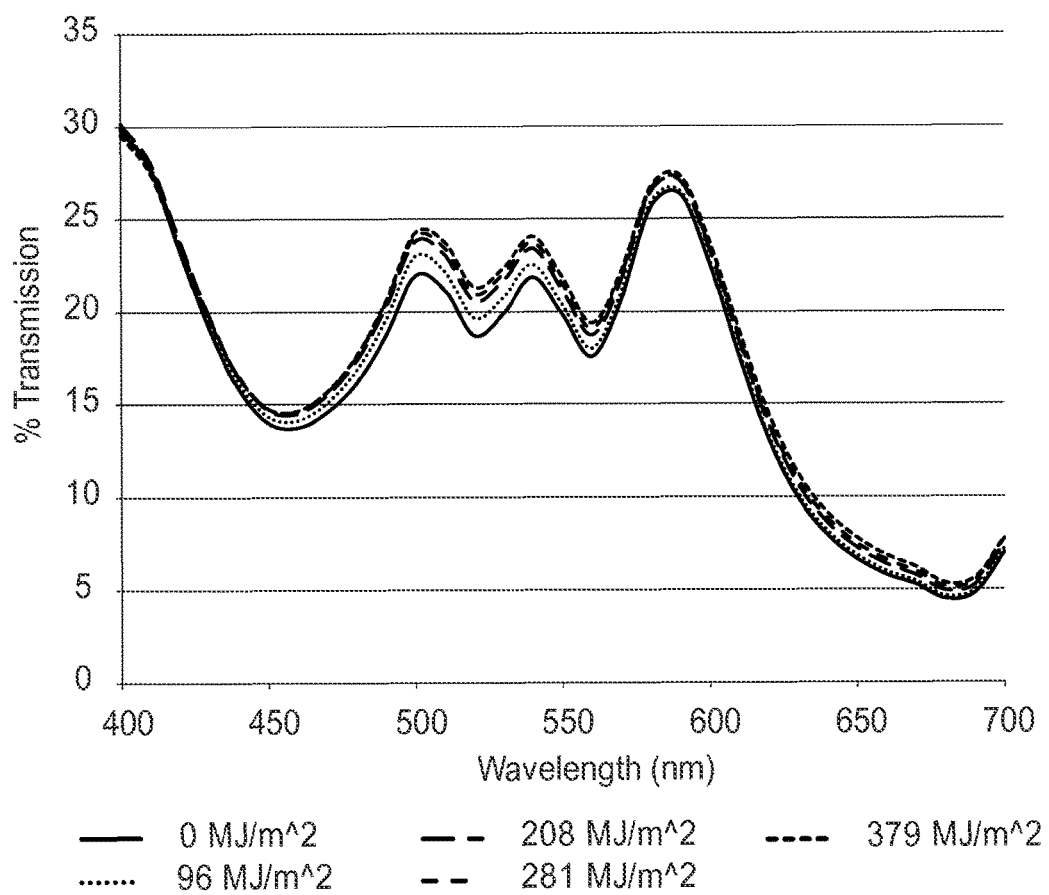
FIG. 3 contains spectra of a window film prepared according to Example 3 taken during accelerated weathering testing.

The resulting window film was laminated to a UVA-containing PSA as described previously, and submitted to the weathering test as described above. Results are shown in FIG. 3.

Example 4

For comparison, commercially available window films made via the traditional solvent dip dye method were weathered as shown in FIG. 4. Another commercially available window film, believed to have been produced by dye extrusion, was weathered as shown in FIG. 5. Both Figures show a detrimental effect of UV exposure on the measured percent transmission of the film throughout the visible spectrum, which translates into a film with significant color fading.

TABLE 3

Comparison of $\Delta VLT$ and $\Delta E_{ab}$ for two comparative window films and three samples of films prepared according to Examples 1 through 3.

| Window Film Construction | $\Delta VLT$ | $\Delta E_{ab}$ | TUV (MJ/m$^2$) |
| --- | --- | --- | --- |
| Comparative Window Film 1 | 5.3 | 6.6 | 377 |
| Comparative Window Film 2 | 16.9 | 18.5 | 383 |
| Film prepared according to Example 1 | 1.8 | 2.8 | 374 |
| Film prepared according to Example 2 | 2.2 | 2.63 | 372 |
| Film prepared according to Example 3 | 2.2 | 3.2 | 379 |

Table 3 presents a summary of $\Delta VLT$ and $\Delta E_{ab}$ for Comparative Window Film Product 1 (a window film product comprising a solvent-dyed film), Comparative Window Film Product 2 (a window film product believed to comprise an extrusion-dyed film), and films prepared according to Examples 1-3. Weathering was accomplished using the method described above in "Weathering Test" and is indicated by Total Ultraviolet dosage (TUV, total irradiance integrated over the band 295-385 nm and time) as shown in the right-hand column. The lower values of $\Delta VLT$ and $\Delta E_{ab}$ for Examples 1 to 3 demonstrate the utility of this invention and the relative colorfastness stability versus the Comparative Window Film Products.

Example 5

The PSA used to adhere the window film to a substrate typically contains a UVA to aid the weathering performance of dyed window films. Therefore, a more insightful study of the durability of the dyed PET film would be accelerated weathering exposure where the PSA does not contain UVA.

Figure 6:
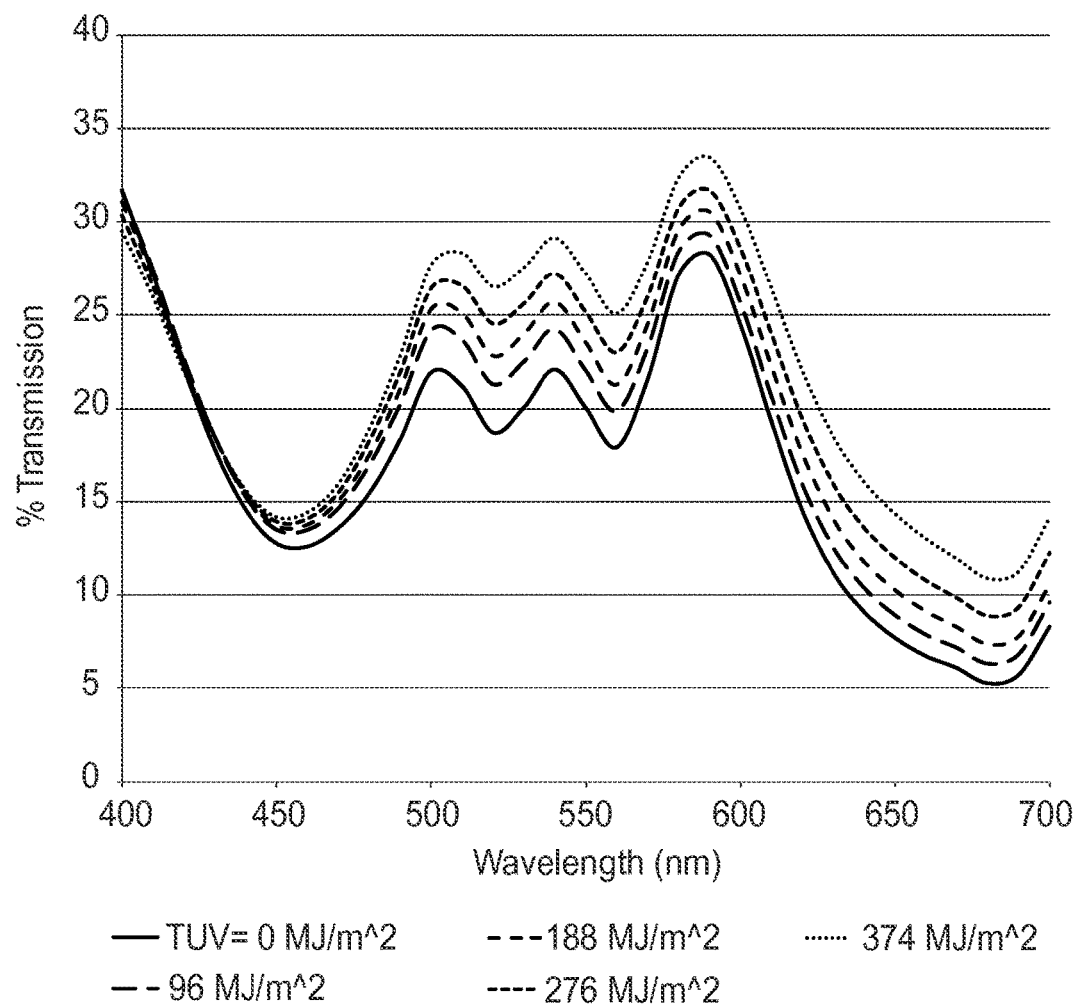
FIG. 6 contains spectra of a monolayer dyed PET film prepared according to Example 1 taken during accelerated weathering testing.
Figure 7:
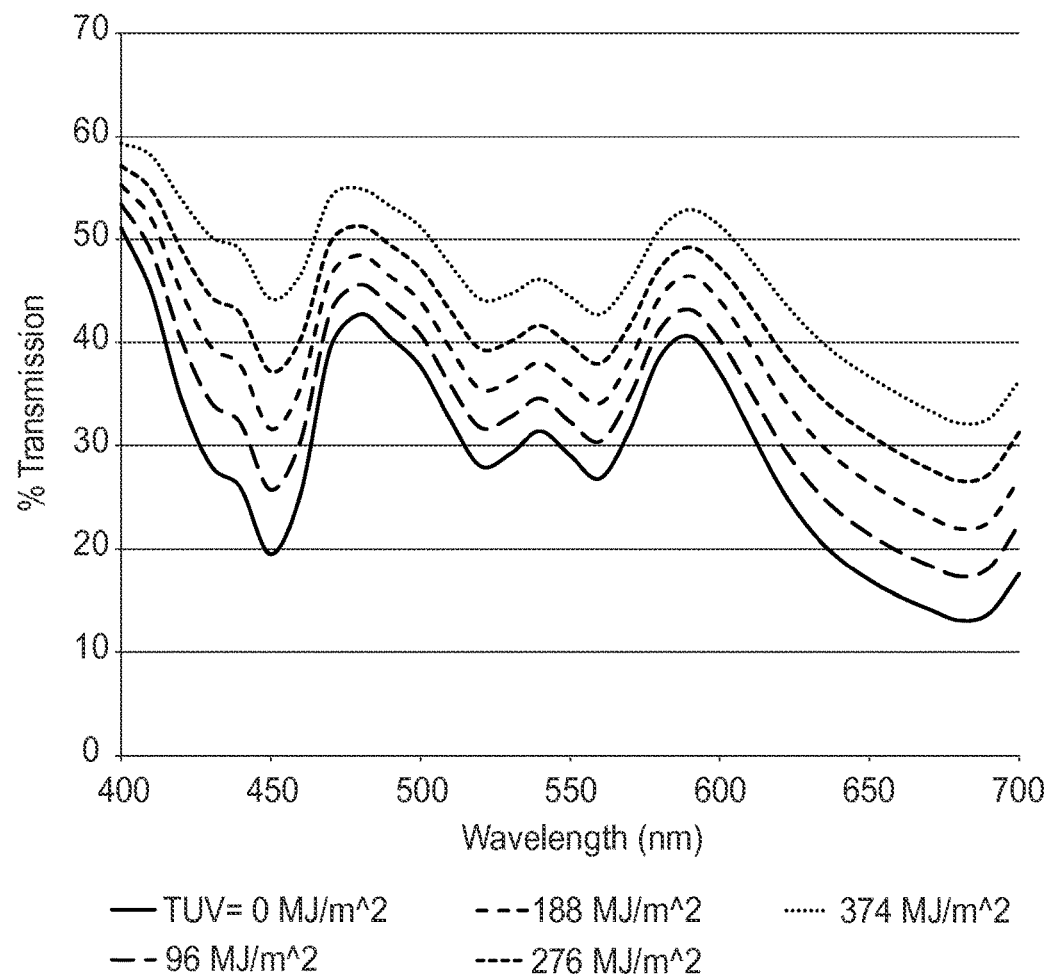
FIG. 7 contains spectra of Comparative Dyed PET Film 1 taken during accelerated weathering testing.
Figure 8:
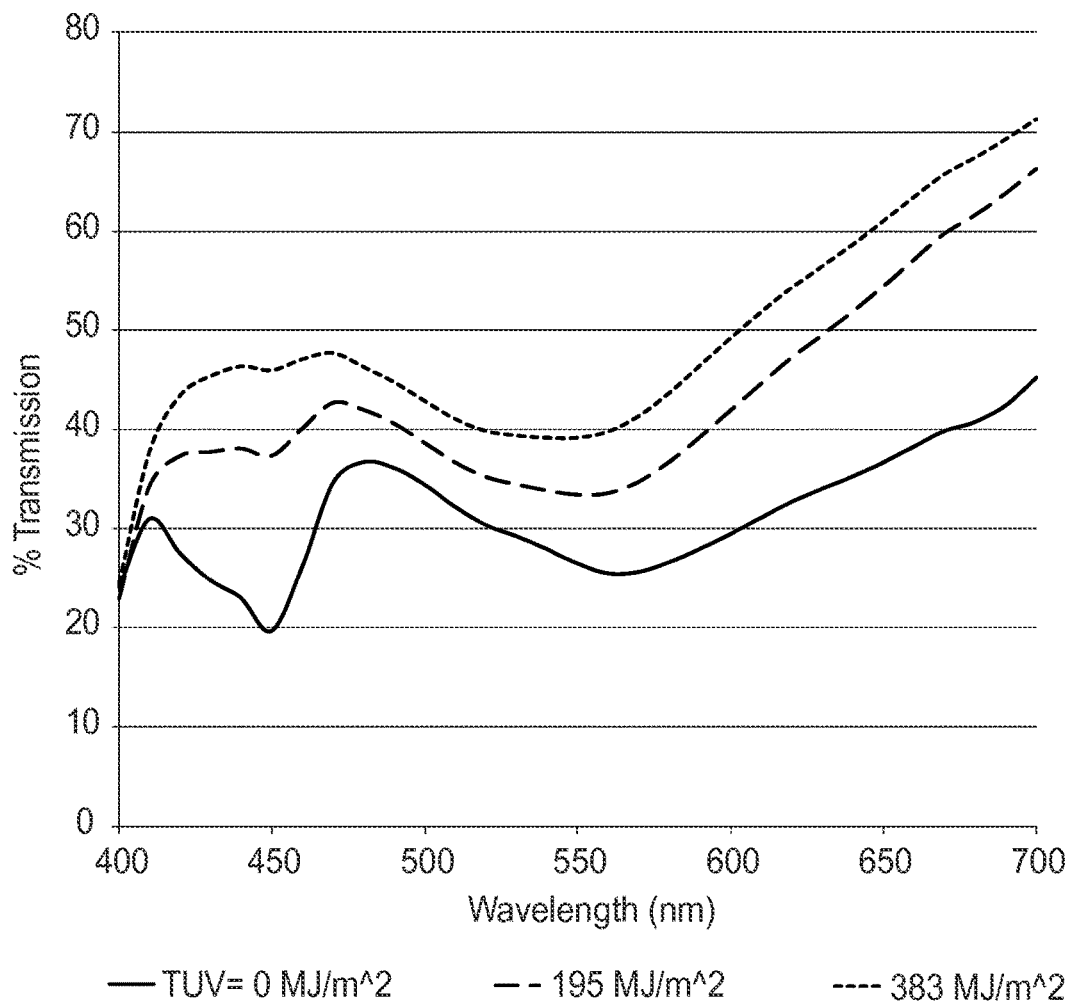
FIG. 8 contains spectra of Comparative Dyed PET Film 2 taken during accelerated weathering testing.

FIG. 6 shows the weathering characteristics of the monolayer dyed film of Example 1 using a PSA that did not contain a UV absorber. Similarly, FIGS. 7 and 8 show the weathering characteristics of the dyed PET films used in Comparative Window Films 1 and 2 using a PSA that did not contain a UV absorber.

TABLE 4

Comparison of $\Delta VLT$ and $\Delta E_{ab}$ for Comparative Dyed PET Film 1, Comparative Dyed PET Film 2, and Example 3 Dyed PET films prepared using a PSA that did not contain a UV absorber.

| Dyed film | $\Delta VLT$ | $\Delta E_{ab}$ | TUV (MJ/m$^2$) |
| --- | --- | --- | --- |
| Comparative Film1 | 15.9 | 13.3 | 374 |
| Comparative Film 2 | 14.9 | 17.4 | 383 |
| Example 3 Dyed PET Film | 6.9 | 10.2 | 374 |

Table 4 presents $\Delta VLT$ and $\Delta E_{ab}$ for Comparative dyed PET Film 1 (a solvent-dyed film used in Comparative Window Film Product 1), Comparative dyed PET Film 2 (which is believed to be an extrusion-dyed film and is used in Comparative Window Film Product 2), and Example 3, a preferred-mode dyed film of the present disclosure.

The difference between Comparative Dyed PET Film 1 and 2 and Comparative Window Film 1 and 2 is that Comparative Window Films 1 and 2 represent commercially available window film products that typically contain a hardcoat layer, a dyed PET film layer, and a PSA typically containing a UVA. Comparative Dyed PET Films 1 and 2 are just the dyed PET films by themselves. The presence of the UVA-containing PSA in the Window Film construction will help to reduce the amount of fading and color change to a limited extent. Weathering was accomplished using the method described above in "Weathering Test" and is indicated by Total Ultraviolet dosage (TUV, total irradiance integrated over the band 295-385 nm and time) as shown in the right-hand column. The lower values of $\Delta$VLT and $\Delta E_{ab}$ for Example 3 demonstrate its relative stability versus the Comparative Films. The changes in the visible transmission spectra of each comparative dyed PET film in Table 4 are shown in FIGS. 6 to 8. These spectra demonstrate the changes in light transmission as a function of UV exposure in the accelerated weathering test.

Example 6

Production of a Film Comprising Pigment Yellow 147

Figure 9:
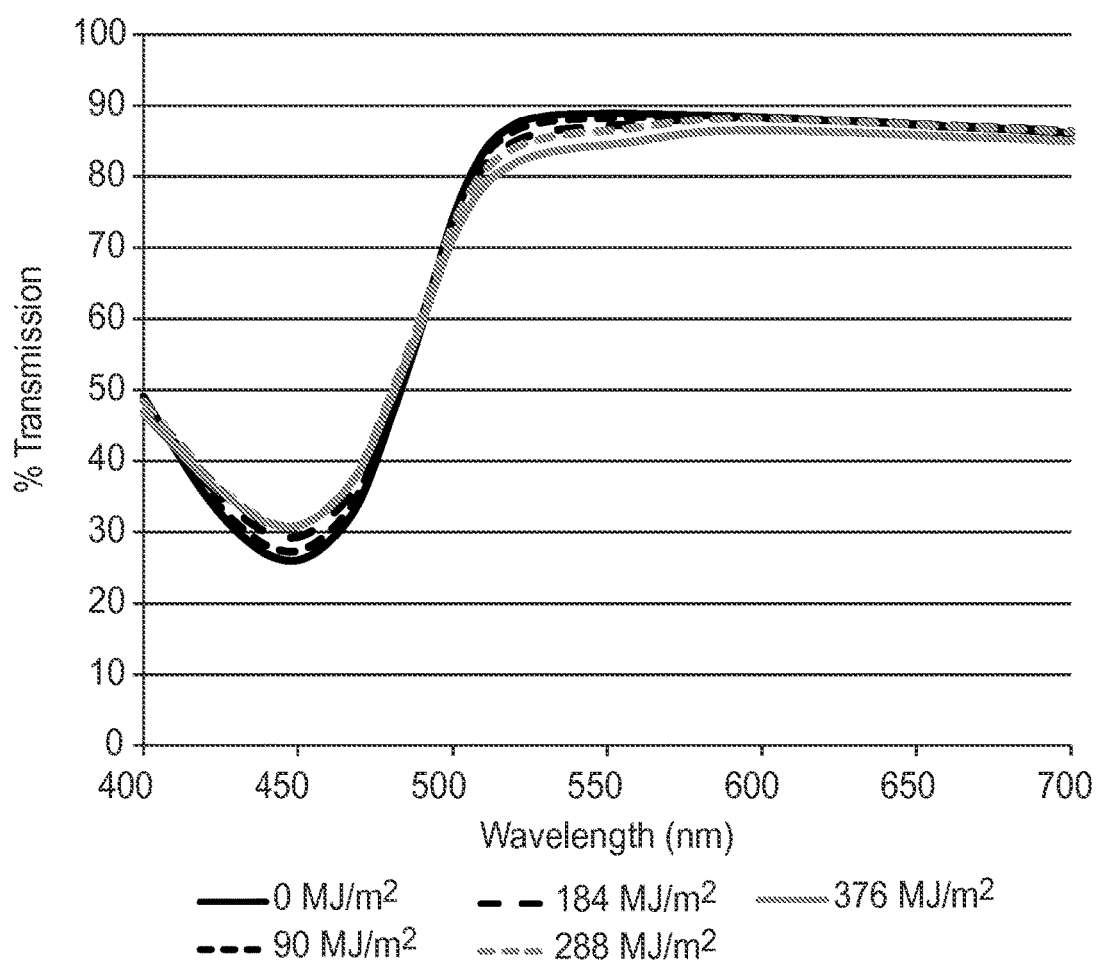
FIG. 9 contains spectra of a film prepared according to Example 6 taken during accelerated weathering using a PSA that did not contain UV absorber.
Figure 10:
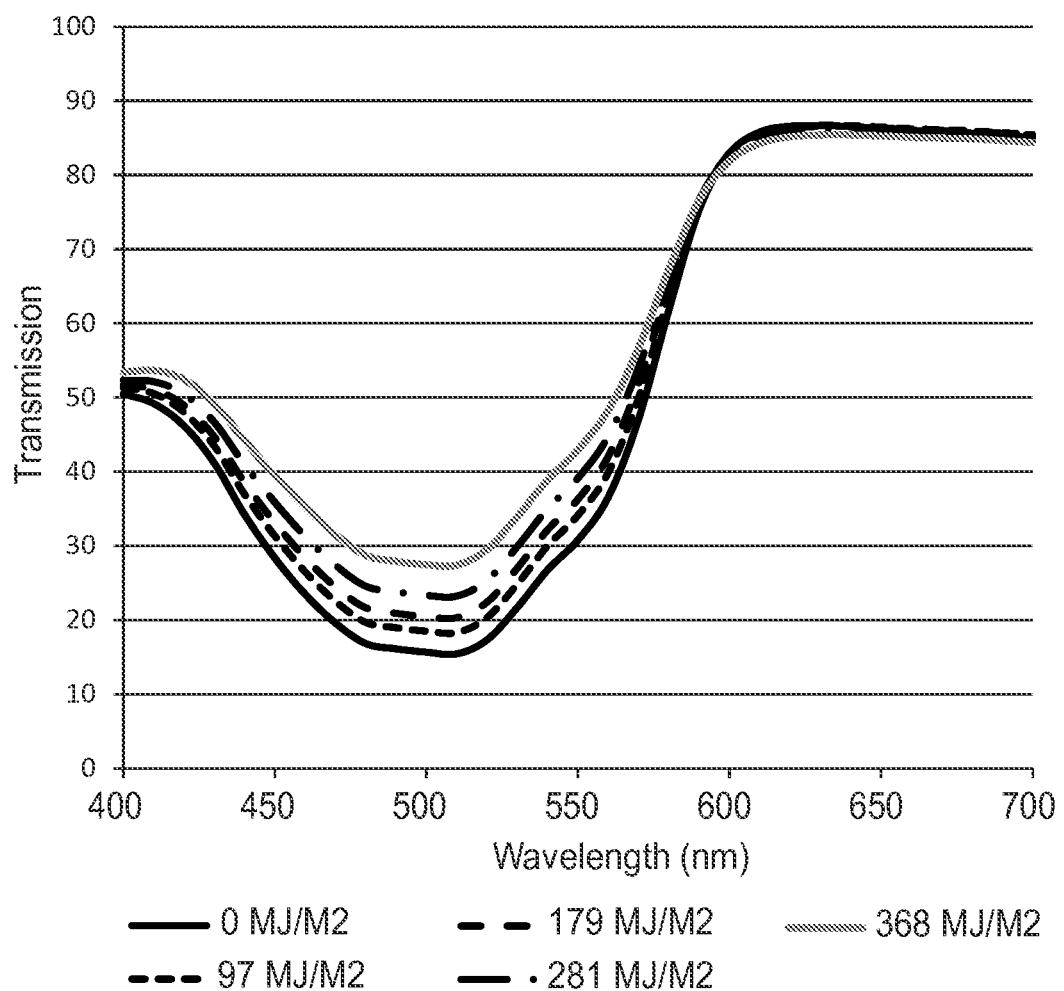
FIG. 10 contains spectra of a film prepared according to Example 11 taken during accelerated weathering.

In a bag, 66.7 grams of a 30% pigment yellow 147 in PET masterbatch (obtained from Penn Color Corporation) was mixed with 4469.3 grams of PET and blended well. This blend was extruded and stretched in a manner similar to Example 2 to produce a film with haze of 0.79% and visible light transmission of 87.2%. This film sample was mounted and weathered as described above under "Weathering test" using a PSA that did not contain UV absorber. Transmission spectra were taken during the accelerated weathering and are shown in FIG. 9. For this sample, $\Delta$VLT=1.5 and $\Delta E_{ab}$=7.65.

Example 7

Production of a Film Comprising Pigment Blue 60

Figure 11:
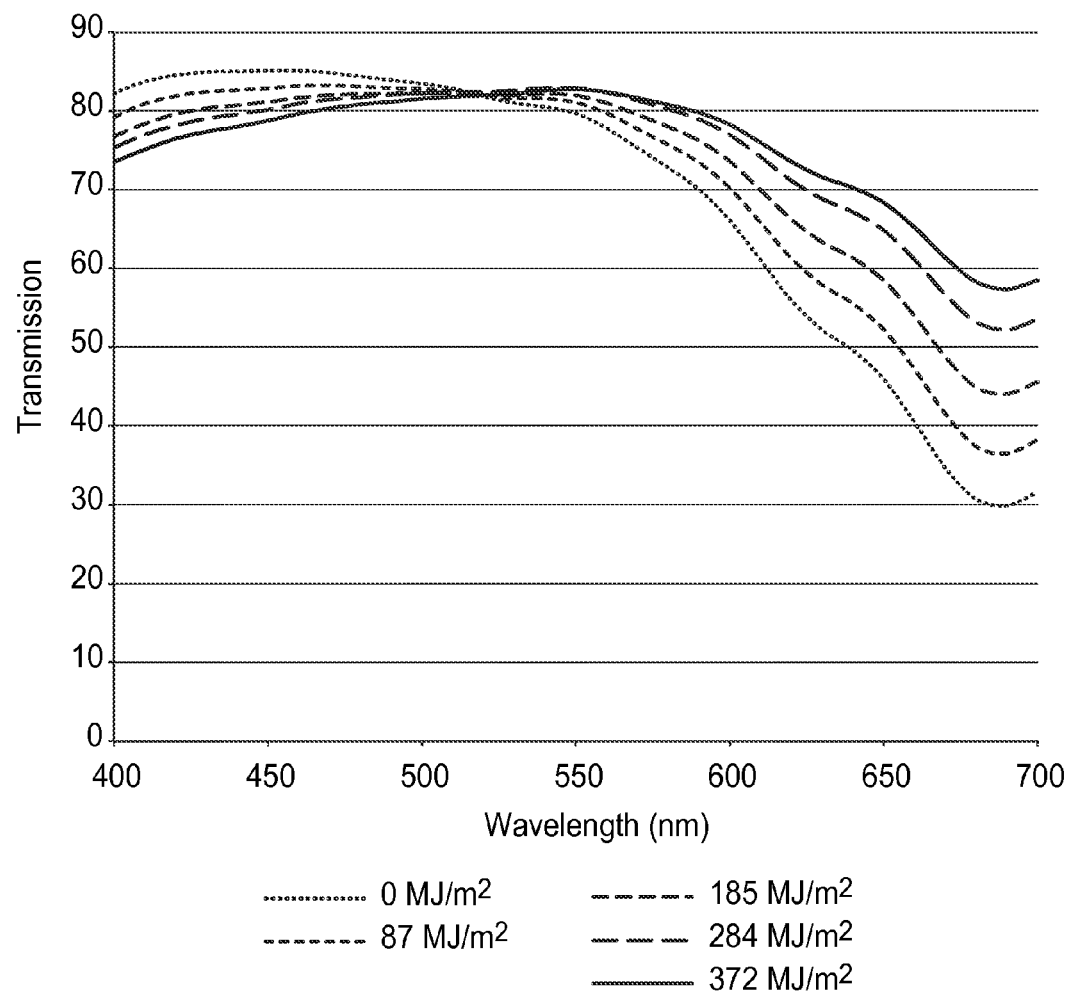
FIG. 11 contains spectra of a film prepared according to Example 7 taken during accelerated weathering using a PSA that did not contain UV absorber.
Figure 12:
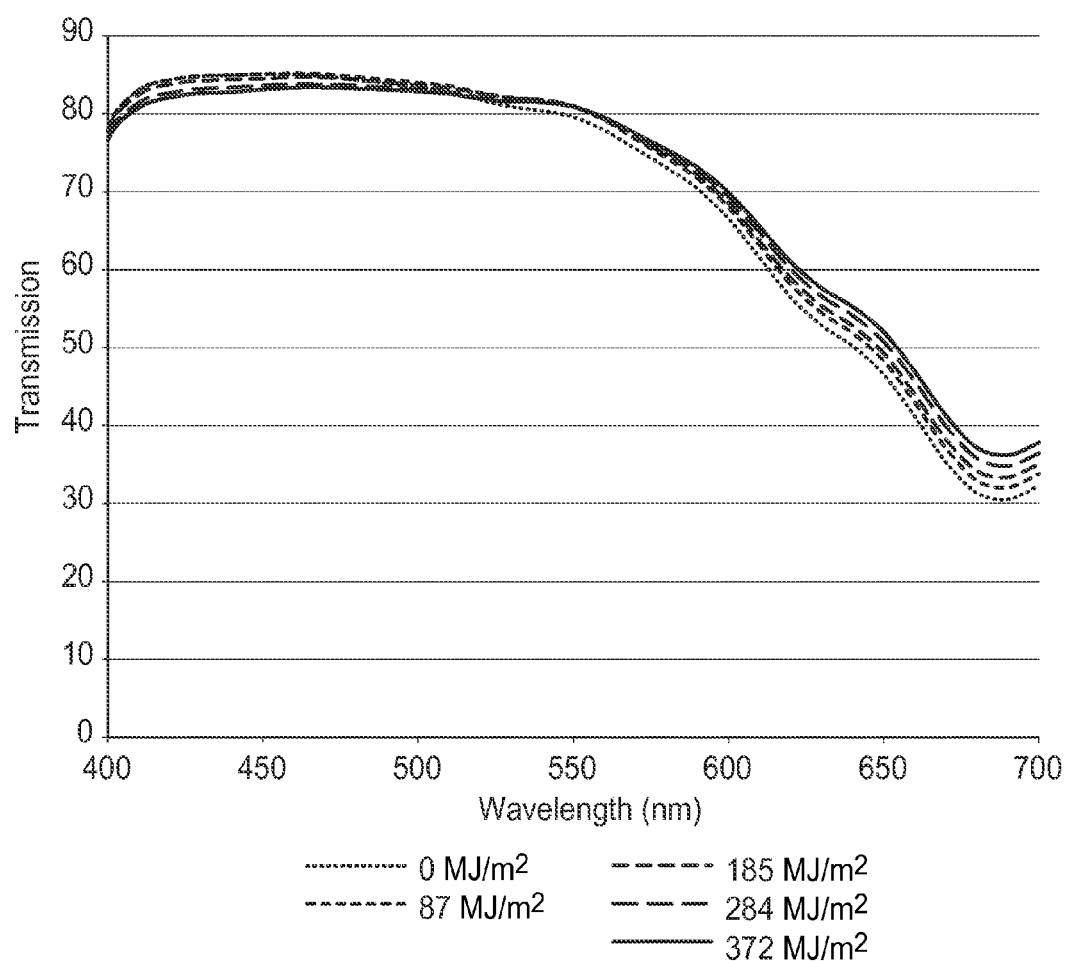
FIG. 12 contains spectra of a film prepared according to Example 7 taken during accelerated weathering using a PSA that contained UV absorber.

In a bag, 350 grams of a 2% Pigment Blue 60 in PET masterbatch (obtained from Penn Color Corporation) were added to 4186 grams of PET resin and mixed well. This mixture was then extrusion-processed and the resulting cast film stretched in a similar manner to Example 2, except that the cast film thickness was about 25 mils and the stretched film thickness was about 2 mils. The initial haze of the film was 0.3% and the visible light transmission was 70%. Weathering testing was conducted as described above. One test series was conducted using samples prepared using a PSA that did not contain UV absorber, and the weathering results are presented in FIG. 11. For this set of samples, $\Delta$VLT=7.5 and $\Delta E_{ab}$=10.49. Another test series was conducting using samples prepared using a PSA that contained UV absorber, and the weathering results are presented in FIG. 12. For this set of samples, $\Delta$VLT=1.9 and $\Delta E_{ab}$=2.93.

Example 8

Production of a Film Comprising Pigment Black 31

Figure 13:
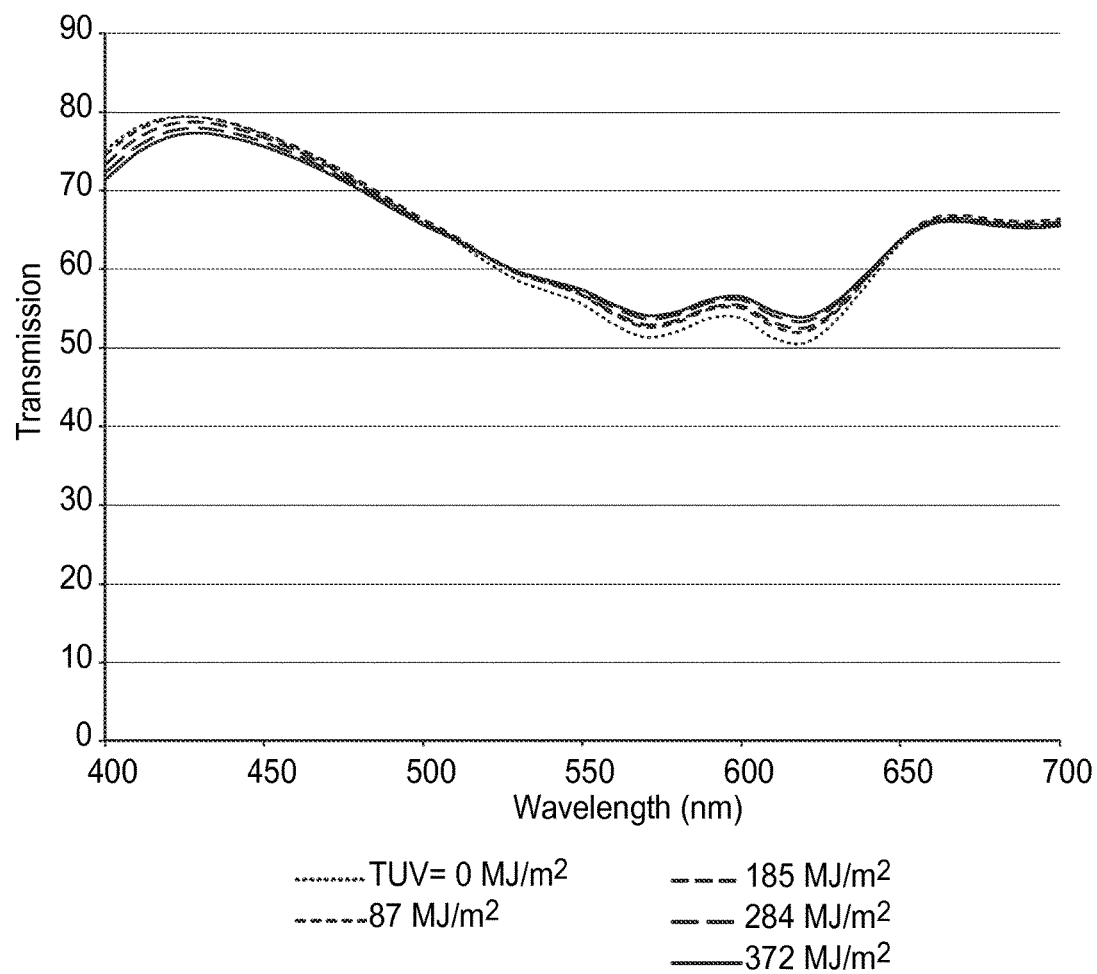
FIG. 13 contains spectra of a film prepared according to Example 8 taken during accelerated weathering using a PSA that did not contain UV absorber.

In a bag, 200 grams of a 2% masterbatch of Lumogen 4280 (BASF) in PET (masterbatch obtained from Penn Color Corporation) were added to 4336 grams of PET resin and mixed well. This mixture was then extrusion-processed and the resulting cast film stretched in a similar manner to Example 2. The initial haze of the film was 1.8% and the visible light transmission was 74.6%. Weathering testing was conducted as described above. The samples were prepared using a PSA that did not contain UV absorber. The weathering results are presented in FIG. 13. For this set of samples, $\Delta$VLT=1.8 and $\Delta E_{ab}$=2.79.

Example 9

Production of a Film Comprising Pigment Red 149

Figure 14:
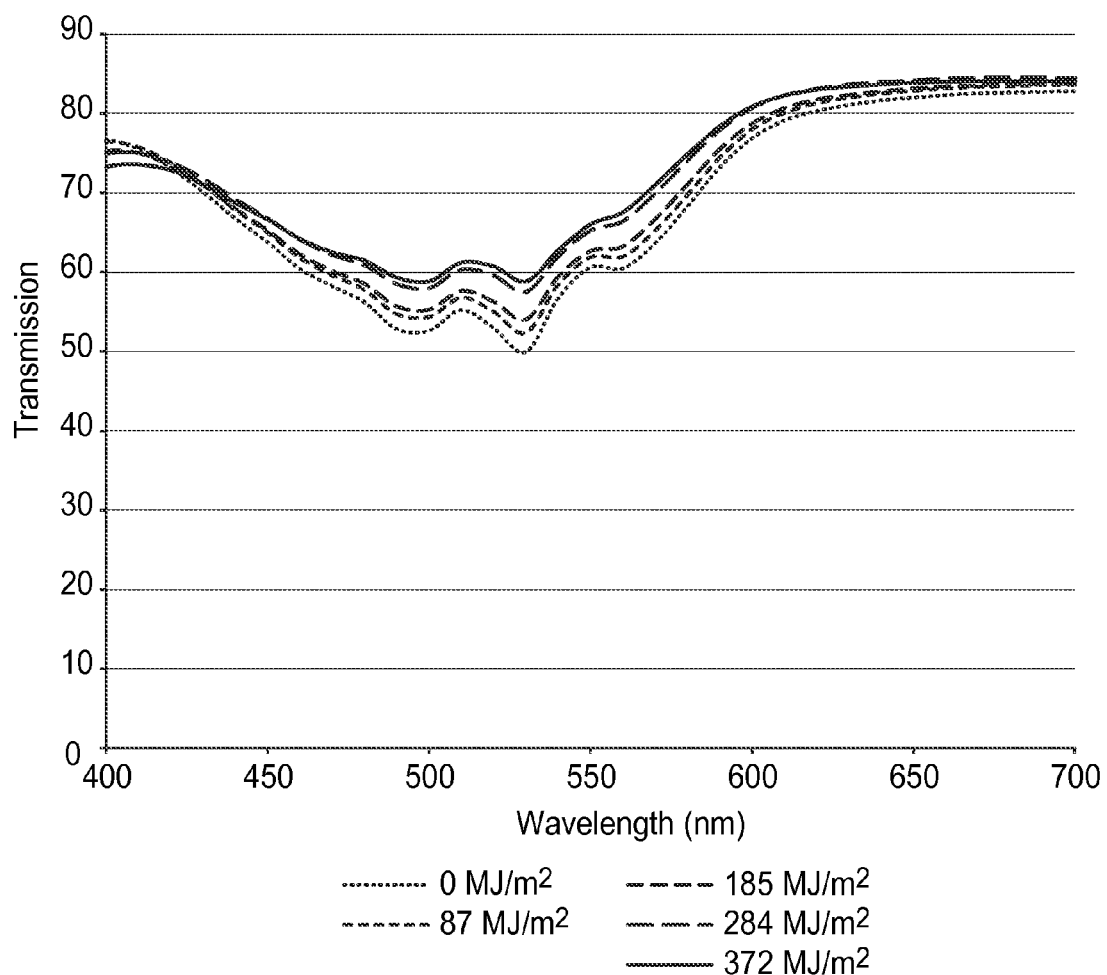
FIG. 14 contains spectra of a film prepared according to Example 9 taken during accelerated weathering using a PSA that did not contain UV absorber.

In a bag, 200 grams of a 2% masterbatch of Pigment Red 149 in PET (obtained from Penn Color Corporation) were added to 4336 grams of PET resin and mixed well. This mixture was then extrusion-processed and the resulting cast film stretched in a similar manner to Example 2. The initial haze of the film was 3.2% and the visible light transmission was 81.4%. Weathering testing was conducted as described above. The samples were prepared using a PSA that did not contain UV absorber. The weathering results are presented in FIG. 14. For Example 9, $\Delta$VLT=4.4 and $\Delta E_{ab}$=5.53.

Example 10

Production of a Film Comprising Pigment Red 122

Figure 15:
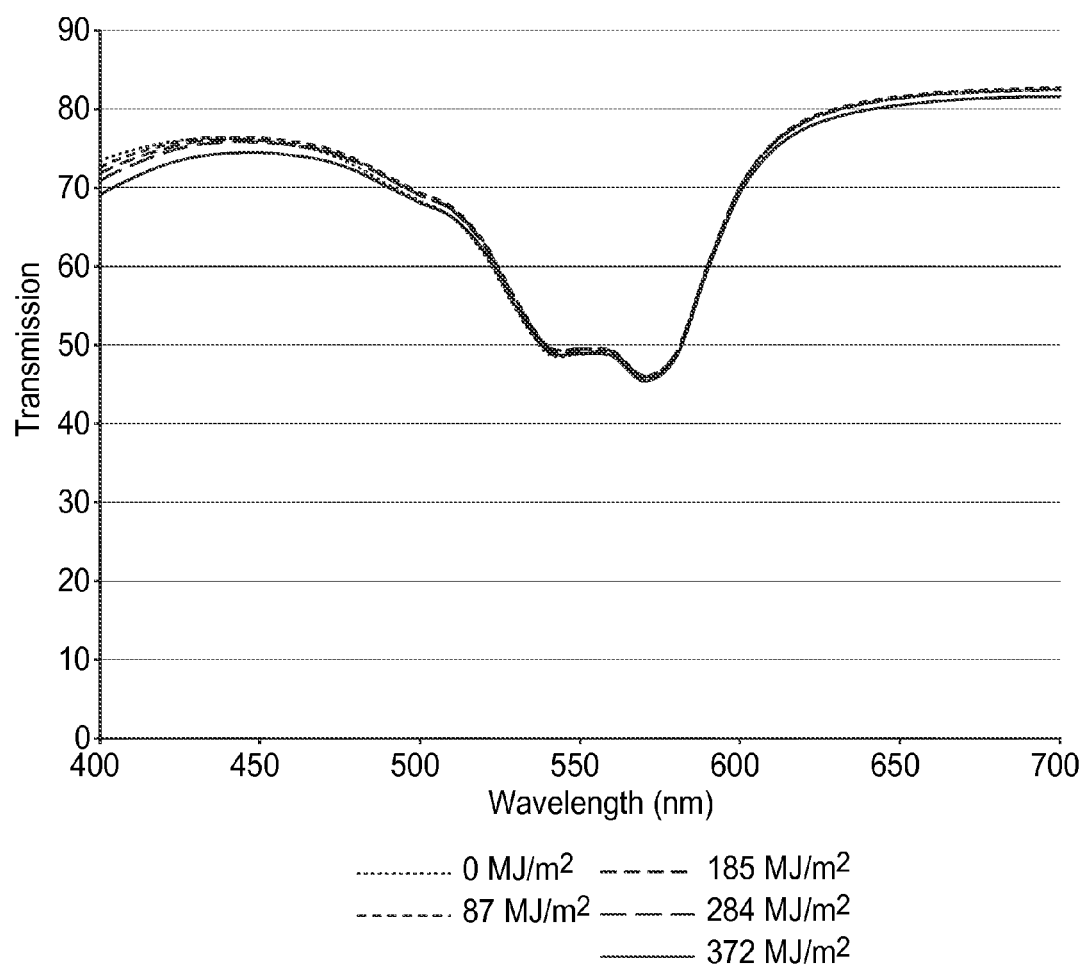
FIG. 15 contains spectra of a film prepared according to Example 10 taken during accelerated weathering using a PSA that did not contain UV absorber.

In a bag, 350 grams of a 2% Pigment Red 122 in PET masterbatch (Penn Color Corporation) were added to 4186 grams of PET resin and mixed well. This mixture was then extrusion-processed and the resulting cast film stretched in a similar manner to Example 2. The initial haze of the film was 2.9% and the visible light transmission was 75.9%. Weathering testing was conducted as described above. The samples were prepared using a PSA that did not contain UV absorber. The weathering results are presented in FIG. 15. For Example 10, $\Delta$VLT=0.90 and $\Delta E_{ab}$=1.46.

Comparative Example 11

Production of a Film Comprising Solvent Red 135

In a bag, 44.65 grams of powdered Solvent Red 135 dye was added to 4536 grams of PET resin and mixed well. This mixture was then extrusion-processed and the resulting cast film stretched in a similar manner to Example 2. The initial haze of the film was 0.49% and the visible light transmission was 42.6%. For this sample, $\Delta$VLT=2.8 and $\Delta E_{ab}$=13.86.

Comparative Example 12

Production of a Film Comprising Ceres Blue

Figure 16:
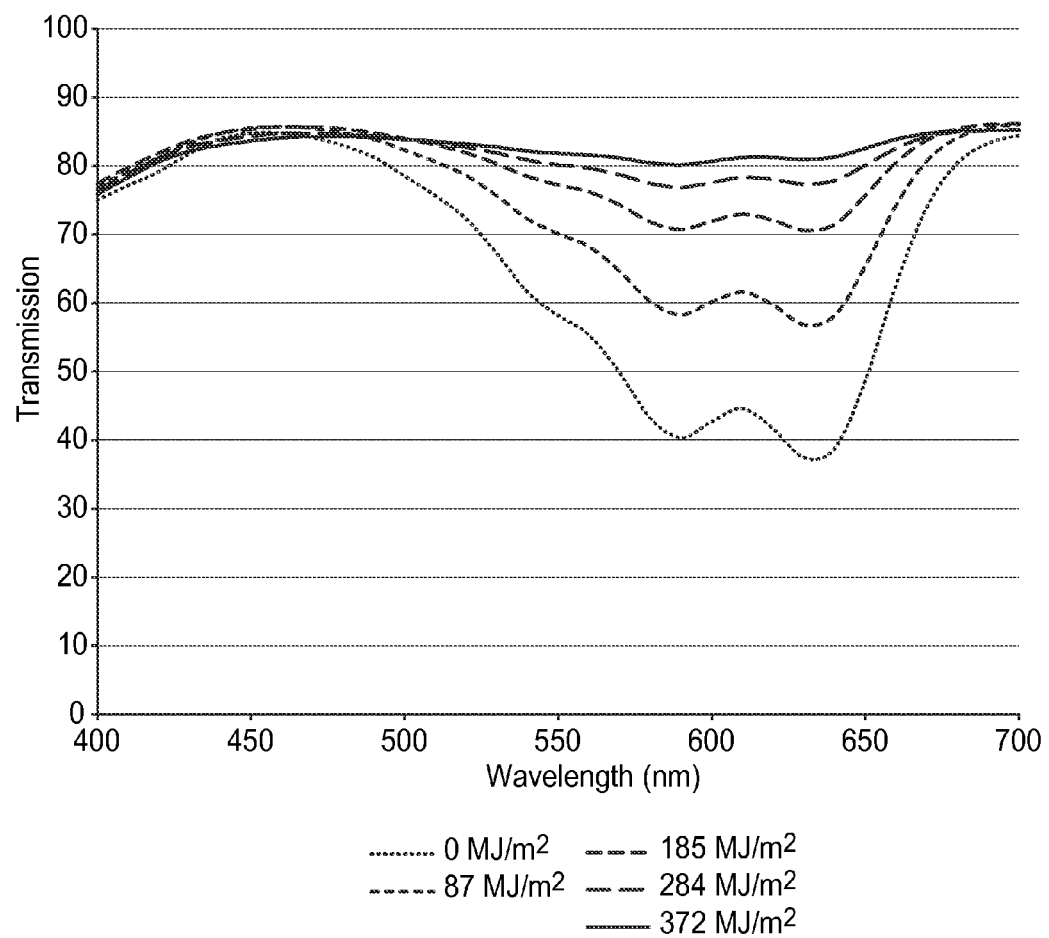
FIG. 16 contains spectra of a film prepared according to Example 12 taken during accelerated weathering using a PSA that did not contain UV absorber.
Figure 17:
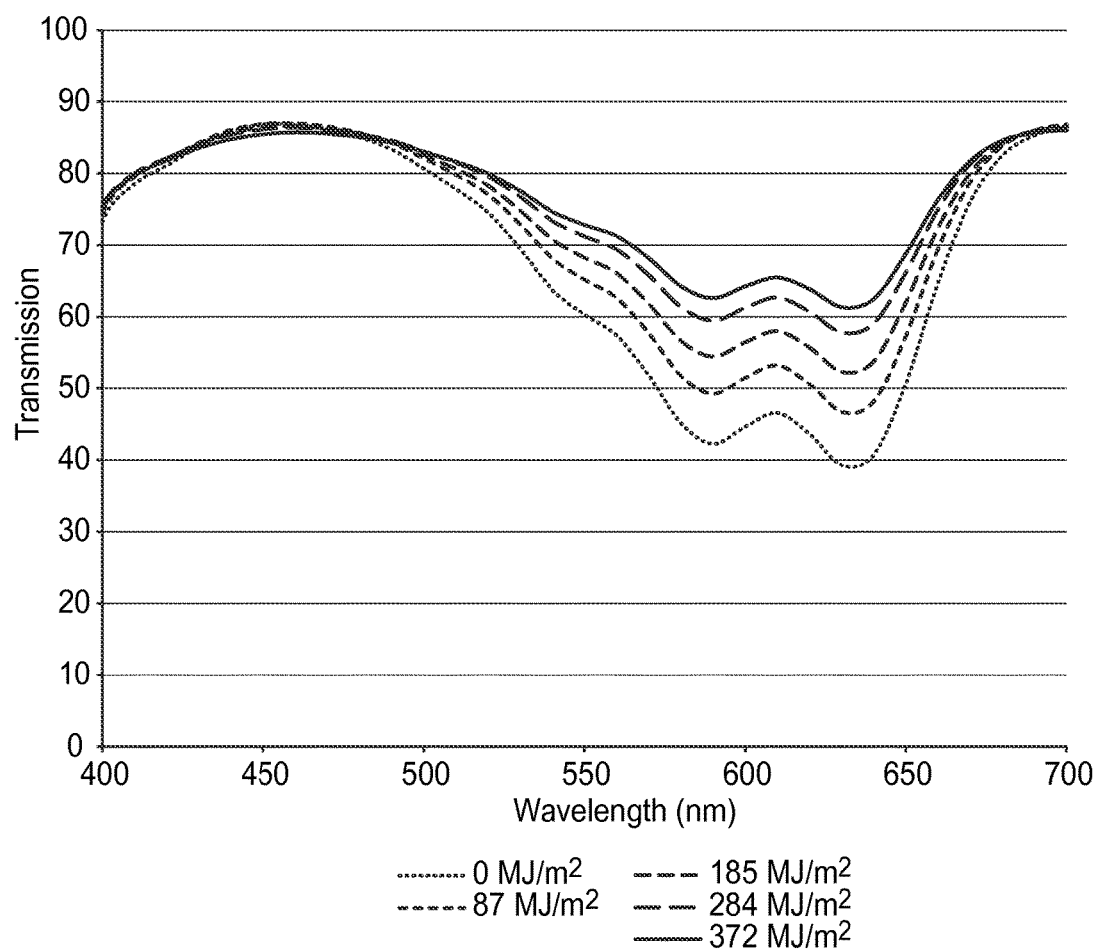
FIG. 17 contains spectra of a film prepared according to Example 12 taken during accelerated weathering using a PSA that contained UV absorber.

In a bag, 300 grams of a masterbatch of Ceres Blue Dye in PET resin at 2.25 weight % was added to 4236 grams of PET resin and mixed well. This mixture was then extrusion-processed and the resulting cast film stretched in a similar manner to Example 2. Weathering testing was conducted as described above. One set of samples were prepared using a PSA that did not contain UV absorber. The weathering results are presented in FIG. 16. For this set of samples, $\Delta$VLT=25.3 and $\Delta E_{ab}$=24.56. Another set of samples were prepared using a PSA that contained UV absorber. The weathering results are presented in FIG. 17. For this set of samples, $\Delta$VLT=13.5 and $\Delta E_{ab}$=13.47.

Example 13

Production of a Film Comprising Pigment Red 177

Figure 18:
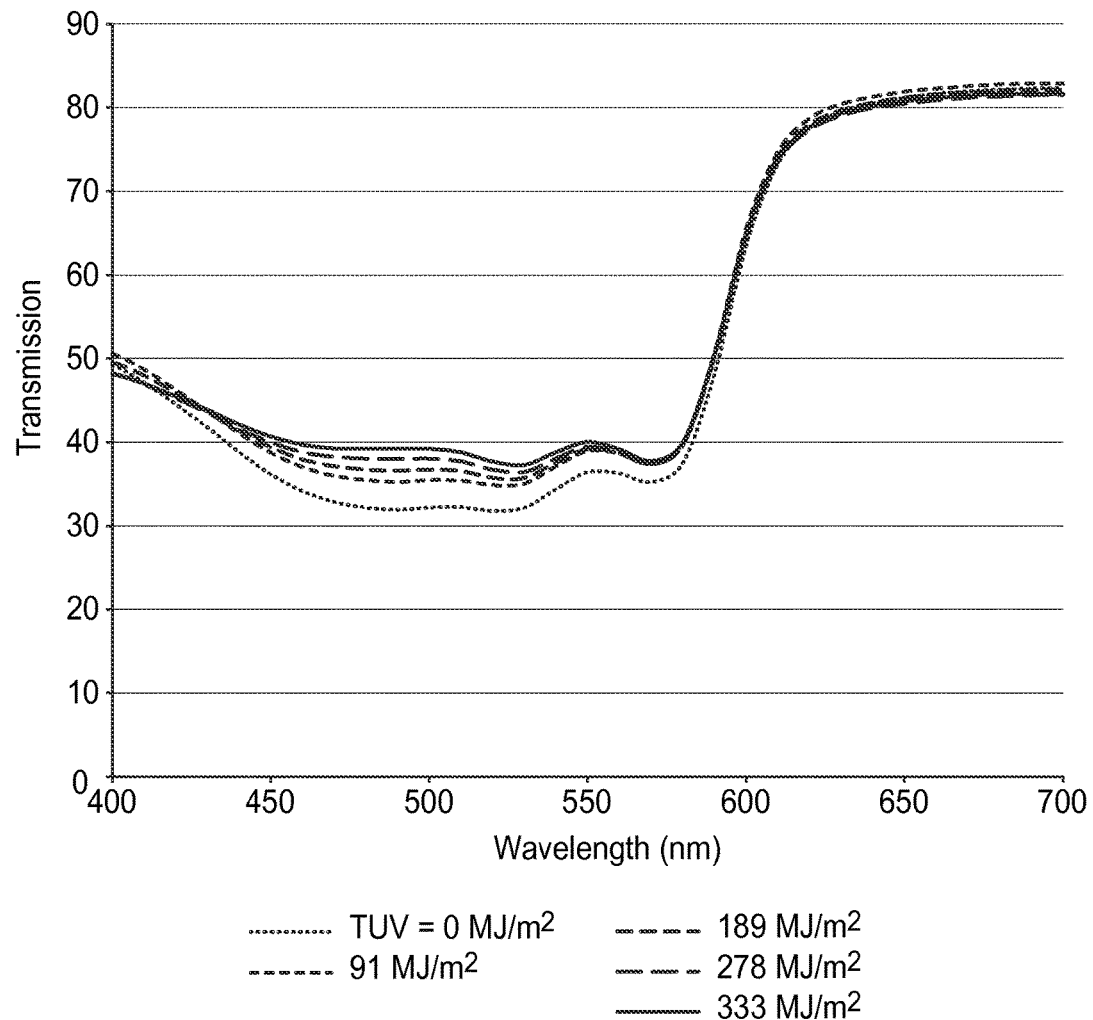
FIG. 18 contains spectra of a film prepared according to Example 13 taken during accelerated weathering using a PSA that did not contain UV absorber.
Figure 19:
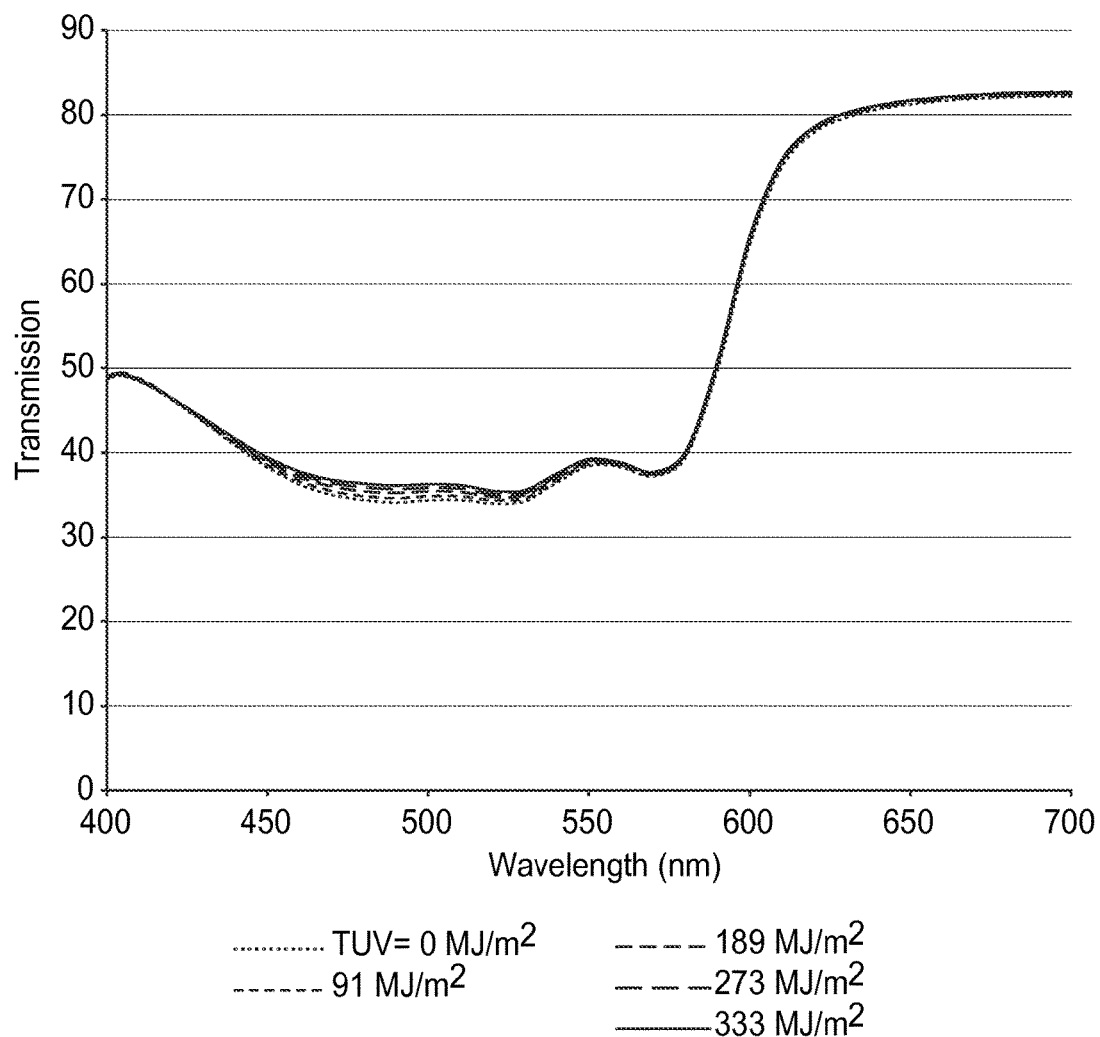
FIG. 19 contains spectra of a film prepared according to Example 13 taken during accelerated weathering using a PSA that contained UV absorber.

In a bag, 200 grams of a masterbatch of 5 weight % Pigment Red 177 blended into PET resin was added to 2068 grams of PET resin and mixed well. This mixture was then extrusion-processed and the resulting cast film stretched in a similar manner to Example 2. Weathering testing was conducted as described above. One set of samples were prepared using a PSA that did not contain a UV absorber. The weathering results are presented in FIG. 18. For this set of samples, $\Delta VLT=2.30$ and $\Delta E_{ab}=5.69$. Another set of samples were prepared using a PSA that contained a UV absorber. The weathering results are presented in FIG. 19. For this set of samples, $\Delta VLT=0.90$ and $\Delta E_{ab}=1.21$.

We claim:

1. An optically clear window film comprising
   a clear first outer layer comprising polyethylene terephthalate (PET),
   a core layer comprising PET and one or more dyes chosen from Pigment Yellow 147, Pigment Red 177, Pigment Blue 60, Pigment Black 31, Pigment Red 149, and Pigment Red 122, and
   a clear second outer layer comprising PET,
   wherein the one or more dyes are dissolved in the PET of the core layer,
   wherein the window film is fade-resistant after more than 300 MJ/m$^2$ of total irradiance integrated over the band 295 nm to 385 nm and time.

2. The window film as claimed in claim 1, wherein window film has a $\Delta Eab^*$ value of less than 6 after more than 300 MJ/m2 of total irradiance integrated over the band 295 nm to 385 nm and time.

3. The window film as claimed in claim 1, wherein the $\Delta VLT$ of the window film is less than 5 after more than 300 MJ/m2 of total irradiance integrated over the band 295 nm to 385 nm and time.

4. The window film as claimed in claim 1, wherein each of the first and second outer layers comprises no added dyes and no added pigments.

5. The window film as claimed in claim 1, wherein the total concentration the dyes in the core layer is from 0.01 weight percent to 15 weight percent with respect to the composition of the core layer.

6. The window film as claimed in claim 1, further comprising a clear hardcoat layer and/or a pressure-sensitive adhesive layer.

7. The window film as claimed in claim 1, further comprising slip particles in at least one of the first or second outer layers.

8. The window film as claimed in claim 1, wherein the haze of the window film is below 5%.

9. The window film as claimed in claim 1, wherein each of the first and second outer layers, independently of each other, further comprises one or more UV stabilizers, and wherein the core layer further comprises one or more UV stabilizers.

10. The window film as claimed in claim 1, wherein the first outer layer, the core layer, and the second outer layer are coextruded.

* * * * *